(12) United States Patent
Tanno et al.

(10) Patent No.: US 9,156,314 B2
(45) Date of Patent: Oct. 13, 2015

(54) PNEUMATIC TIRE AND METHOD OF MANUFACTURING PNEUMATIC TIRE

(75) Inventors: Atsushi Tanno, Hiratsuka (JP); Noboru Takada, Hiratsuka (JP); Yuji Sato, Hiratsuka (JP); Jun Matsuda, Hiratsuka (JP); Yuji Kodama, Hiratsuka (JP); Susumu Imamiya, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 221 days.

(21) Appl. No.: 13/335,359

(22) Filed: Dec. 22, 2011

(65) Prior Publication Data

US 2012/0160387 A1    Jun. 28, 2012

(30) Foreign Application Priority Data

Dec. 28, 2010  (JP) ................................. 2010-294204
Dec. 28, 2010  (JP) ................................. 2010-294205
Nov. 21, 2011  (JP) ................................. 2011-254253

(51) Int. Cl.
| | | |
|---|---|---|
| *B60C 9/18* | (2006.01) | |
| *B60C 19/00* | (2006.01) | |
| *B29D 30/70* | (2006.01) | |
| *B60C 9/28* | (2006.01) | |

(52) U.S. Cl.
CPC . *B60C 9/18* (2013.01); *B29D 30/70* (2013.01); *B60C 9/28* (2013.01)

(58) Field of Classification Search
CPC .............. B60C 9/00; B60C 9/18; B60C 9/28; B60C 11/00; B60C 19/00; B60C 2009/18; B60C 2009/28; B60C 2011/00
See application file for complete search history.

(56) References Cited

FOREIGN PATENT DOCUMENTS

| | | |
|---|---|---|
| DE | 2355489 | * 5/1975 |
| EP | 432127 | * 6/1991 |
| JP | S51-072003 | 6/1976 |
| JP | 03-047203 | 5/1991 |
| JP | 05-018901 | 3/1993 |
| JP | 05-238206 | 9/1993 |
| JP | 2002-002220 | 1/2002 |
| JP | 2002-337509 | 11/2002 |
| JP | 2006-103397 | 4/2006 |
| JP | 2009-220542 | 10/2009 |

OTHER PUBLICATIONS

Machine translation of DE 2355489, 1975.*
Machine translation of EP 432127, 1991.*
www.engineeringtoolbox.com, no date.*
Recent Technical Trends in Tires; Akimasa DOI, Journal of the Society of Rubber Industry, vol. 71; Sep. 1998; partial English Translation pp. 588-594.
Japanese Office Action dated Oct. 29, 2013, 6 pages, Japan.
Japanese Office Action for Japanese Patent Application No. 2010-294204 dated Jul. 22, 2014, 6 pages, Japan.

* cited by examiner

*Primary Examiner* — Justin Fischer
(74) *Attorney, Agent, or Firm* — Thorpe North & Western

(57) ABSTRACT

A pneumatic tire including a cylindrical annular structure, a rubber layer that will become a tread portion provided along a circumferential direction of the annular structure, on an outer side of the annular structure, and a carcass portion including fibers covered by rubber, provided on both sides in a direction parallel to a center axis (Y-axis) of a cylindrical structure including the annular structure and the rubber layer. In a meridian cross-sectional view of the structure, an outer side of the rubber layer and the outer side of the annular structure have the same form.

21 Claims, 22 Drawing Sheets

PNEUMATIC TIRE AND METHOD OF MANUFACTURING PNEUMATIC TIRE

PRIORITY CLAIM

Priority is claimed to Japan Patent Application Serial No. 2010-294204 filed on Dec. 28, 2010, Japan Patent Application Serial No. 2010-294205 filed on Dec. 28, 2010, and Japan Patent Application Serial No. 2011-254253 filed on Nov. 21, 2011.

BACKGROUND

1. Technical Field

The present technology relates to a pneumatic tire.

2. Related Art

Reducing the rolling resistance of a pneumatic tire is useful for improving the fuel consumption of a vehicle. Techniques exist for reducing the rolling resistance of a tire such as, for example, using a silica-compounded rubber for the tread.

While the technique for reducing the rolling resistance of pneumatic tires described in Recent Technical Trends in Tires, Akimasa DOI, Journal of the Society of Rubber Industry, September 1998, Vol. 71, p. 588-594 provides an improvement to the material, it is also possible to reduce the rolling resistance by modifying the structure of the pneumatic tire.

SUMMARY

The present technology provides a structure whereby the rolling resistance of a pneumatic tire is reduced. A pneumatic tire includese: a cylindrical annular structure having a plurality of through-holes; a rubber layer that will become a tread portion, provided along a circumferential direction of the annular structure on an outer side of the annular structure; and a carcass portion including fibers covered by rubber, provided on at least both sides in a direction parallel to a center axis of the cylindrical structure including the annular structure and the rubber layer.

A pneumatic tire includese: a cylindrical annular structure having a plurality of through-holes; a rubber layer that will become a tread portion, provided along a circumferential direction of the annular structure on an outer side of the annular structure; a groove provided on an outer side in a radial direction of the rubber layer; and a carcass portion including fibers covered by rubber, provided on at least both sides in a direction parallel to a center axis of the cylindrical structure including the annular structure and the rubber layer. An opening ratio of the through-holes in at least a region where the groove is provided is less than that in a region in a vicinity of the region where the groove is provided.

A proportion of a total of an opening area of the through-holes to a surface area of the outer side in the radial direction in a case where the annular structure does not include the through-holes, is preferably not less than 1% and not more than 30% in a region in a vicinity of a circumferential groove and not less than 0.5% and not more than 15% in a region where the circumferential groove is provided.

A cross-sectional area of one of the through-holes is preferably not less than 0.1 mm$^2$ and not more than 100 mm$^2$.

A sum of the area of the through-holes is preferably not less than 0.5% and not more than 30% of the surface area of the outer side in the radial direction of the annular structure.

The outer side of the rubber layer and the outer side of the annular structure, except a groove portion of the rubber layer, are preferably parallel to the center axis.

The annular structure is preferably disposed farther outward in a radial direction of the structure than the carcass portion.

The annular structure is preferably a metal.

A dimension in the direction parallel to the center axis of the annular structure is preferably not less than 50% and not more than 95% of a total width in the direction parallel to the center axis of the pneumatic tire.

A method of manufacturing a pneumatic tire is provided, the pneumatic tire including a rubber layer that will become a tread portion, provided on an outer side of a cylindrical annular structure. The method includes the steps of: obtaining a cylindrical annular structure having a plurality of through-holes and wherein an opening ratio of the through-holes in a region of the tread portion where a groove is provided is less than that in a region in a vicinity of the region where the groove is provided; fabricating a green tire by disposing non-vulcanized rubber on an outer side in a radial direction and on an inner side in the radial direction of the annular structure, respectively; and passing the rubber on the inner side in the radial direction of the annular structure through the through-holes to the outer side in the radial direction by applying pressure and heat to the green tire from the inner side in the tire radial direction of the green tire after setting the green tire in a vulcanization mold.

The present technology can provide a structure whereby the rolling resistance of a pneumatic tire is reduced.

BRIEF DESCRIPTION OF THE DRAWINGS

FIG. 2-1 is a perspective view of an annular structure included in the tire according to the first embodiment.

FIG. 2-2 is a plan view of the annular structure included in the tire according to the first embodiment.

FIG. 5-1 is a drawing illustrating a modified example of the annular structure included in the tire according to the first embodiment.

FIG. 5-2 is a drawing illustrating a modified example of the annular structure included in the tire according to the first embodiment.

FIG. 5-3 is a plan view illustrating a modified example of an annular structure including recesses and protrusions on both edges in a width direction.

FIG. 5-4 is a plan view illustrating a modified example of an annular structure including recesses and protrusions on both edges in the width direction.

FIG. 16-1 is a perspective view of an annular structure included in the tire according to a second embodiment.

FIG. 16-2 is a perspective view of a modified example of the annular structure included in the tire according to the second embodiment.

FIG. 23-1 is a schematic view illustrating a state when vulcanizing the tire in a vulcanization mold.

FIG. 23-2 is a schematic view illustrating a state when vulcanizing the tire in a vulcanization mold.

FIG. 24-1 is a schematic view illustrating a state when vulcanizing the tire in a vulcanization mold.

FIG. 24-2 is a schematic view illustrating a state when vulcanizing the tire in a vulcanization mold.

FIG. 25-1 is a schematic view illustrating a state when vulcanizing the tire in a vulcanization mold.

FIG. 25-2 is a schematic view illustrating a state when vulcanizing the tire in a vulcanization mold.

FIG. 26-1 is a schematic view illustrating a state when vulcanizing the tire in a vulcanization mold.

FIG. 26-2 is a schematic view illustrating a state when vulcanizing the tire in a vulcanization mold.

FIG. 28-1 is an explanatory drawing illustrating a step of the method for manufacturing the annular structure.

FIG. 28-2 is an explanatory drawing illustrating a step of the method for manufacturing the annular structure.

FIG. 28-3 is an explanatory drawing illustrating a step of the method for manufacturing the annular structure.

FIG. 28-4 is a cross-sectional view illustrating a thickness of a welded portion.

DETAILED DESCRIPTION

Figure 1:
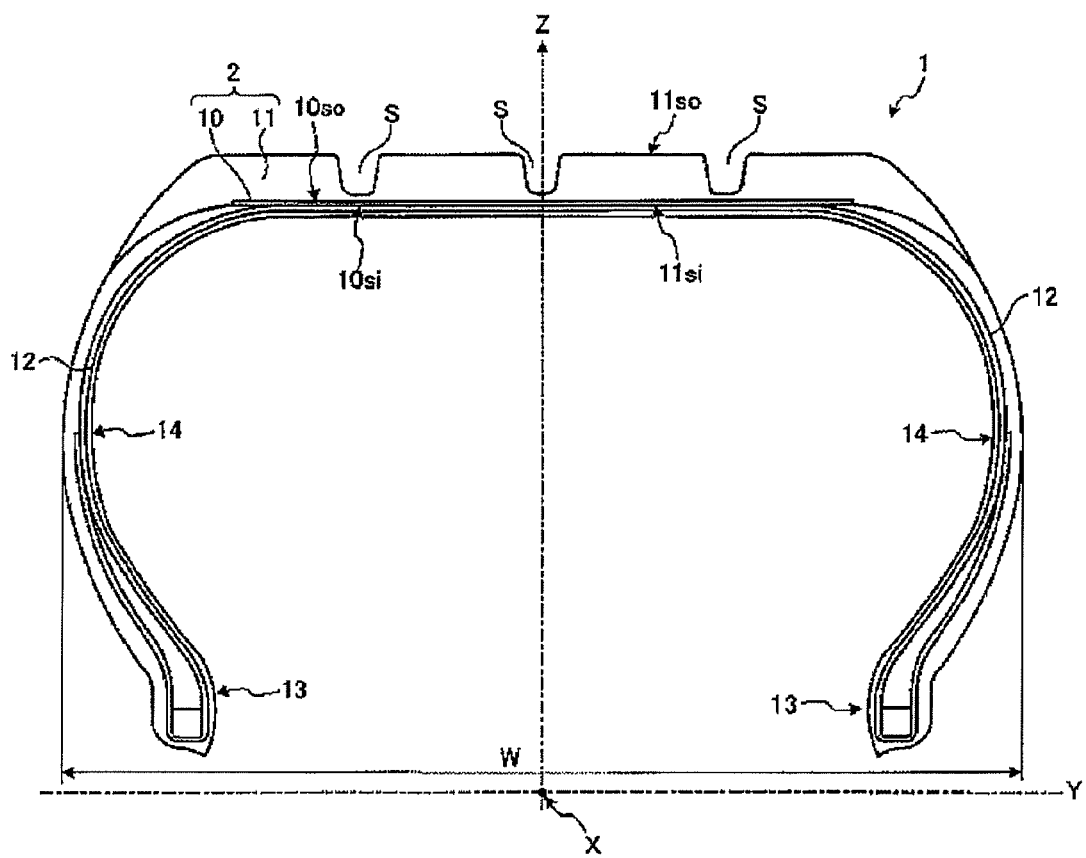
FIG. 1 is a meridian cross-sectional view of a tire according to a first embodiment.

Forms of the present technology (embodiments) are described below in detail while referring to the drawings. However, the present technology is not limited to the descriptions given in the embodiments. Additionally, the constituents described below include those constituents that could be easily conceived by a person skilled in the art, and constituents that are essentially identical to those described herein. Furthermore, it is possible to combine the constituents described below as desired.

First Embodiment

When eccentric deformation is increased to a limit thereof in order to reduce the rolling resistance of a pneumatic tire (hereinafter referred to as "tire" as necessary), ground contact area between the tire and a road surface decreases and ground contact pressure increases. As a result, viscoelastic energy loss, caused by deformations of a tread portion, increases, leading to an increase in rolling resistance. The present inventors focused on this point and attempted to reduce rolling resistance and enhance steering stability by ensuring the ground contact area between the tire and the road surface and maintaining eccentric deformation. Eccentric deformation is a single-dimensional mode of deformation in which a tread ring (crown region) of the tire shifts vertically while the round form of the tire is maintained. In order to ensure ground contact area between the tire and the road surface and maintain eccentric deformation, the tire according to this embodiment uses, for example, a structure including a cylindrical annular structure that is manufactured from a thin plate of a metal. A rubber layer is provided along a circumferential direction on an outer side of the annular structure. This rubber layer constitutes the tread portion of the tire.

Figures 1, 2:
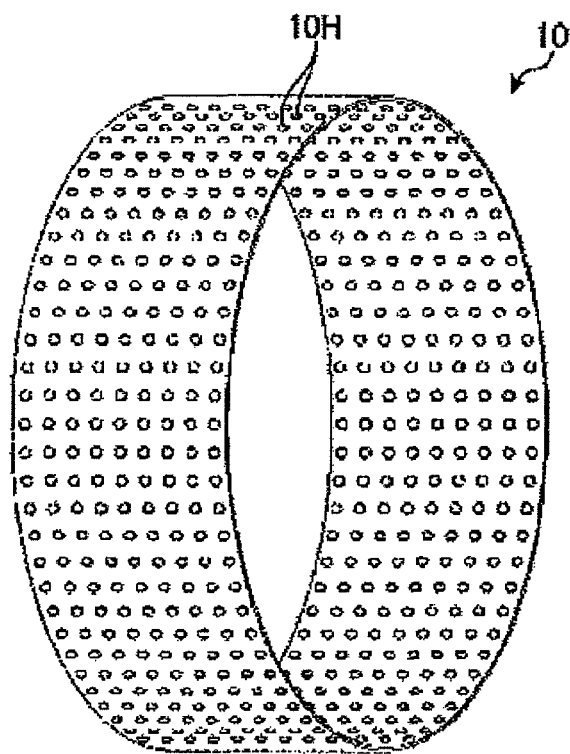
Figure 2:
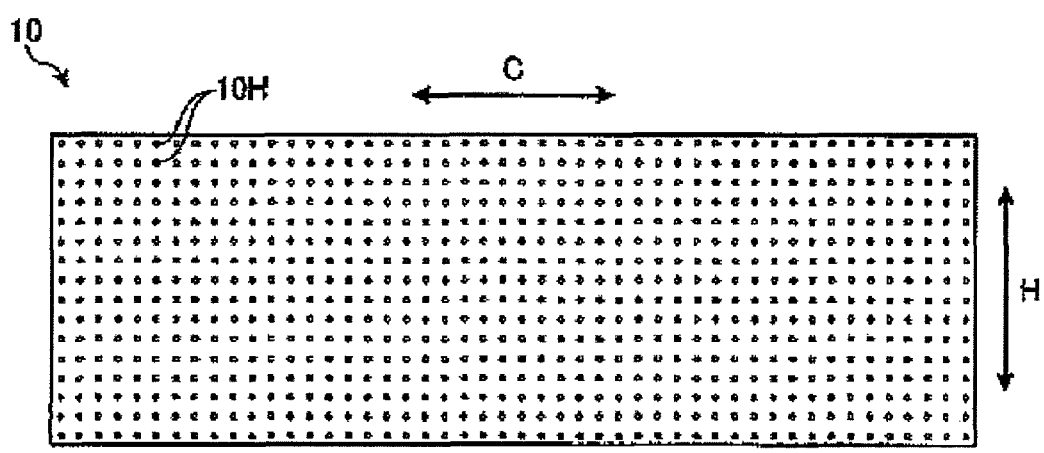
Figure 3:
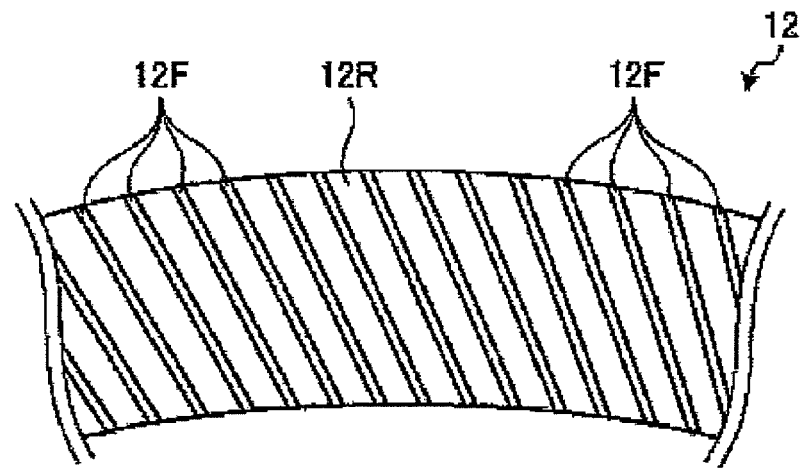
FIG. 3 is an enlarged view of a carcass portion included in the tire according to the first embodiment.

FIG. 1 is a meridian cross-sectional view of a tire according to the first embodiment. FIG. 2-1 is a perspective view of an annular structure included in the tire according to the first embodiment. FIG. 2-2 is a plan view of the annular structure included in the tire according to the first embodiment. FIG. 3 is an enlarged view of a carcass portion included in the tire according to the first embodiment. As illustrated in FIG. 1, the tire 1 is an annular structure. An axis that passes through a center of the annular structure is a center axis (Y-axis) of the tire 1. When in use, an interior of the tire 1 is filled with air.

The tire 1 rotates having the center axis (Y-axis) as a rotational axis. The Y-axis is the center axis and the rotational axis of the tire 1. An X-axis is an axis that is orthogonal to the Y-axis (the center axis (rotational axis) of the tire 1), and is parallel to a road surface that the tire 1 makes ground contact with. A Z-axis is an axis that is orthogonal to the Y-axis and the X-axis. A direction that is parallel to the Y-axis is a width direction of the tire 1. A direction that passes through the Y-axis and is orthogonal to the Y-axis is a radial direction of the tire 1. Additionally, a circumferential direction centered on the Y-axis is a circumferential direction of the pneumatic tire 1 (the direction indicated by the arrow "CR" in FIG. 1).

As illustrated in FIG. 1, the tire 1 includes a cylindrical annular structure 10, a rubber layer 11, and a carcass portion 12. The annular structure 10 is a cylindrical member. The rubber layer 11 is provided along the circumferential direction of the annular structure 10 on an outer side 10so of the annular structure 10, and constitutes the tread portion of the tire 1. As illustrated in FIG. 3, the carcass portion 12 includes fibers 12F covered by rubber 12R. In this embodiment, as illustrated in FIG. 1, the carcass portion 12 is provided on an inner side in the radial direction of the annular structure 10 and connects both bead portions 13. In other words, the carcass portion 12 is continuous between both of the bead portions 13 and 13. Note that while the carcass portion 12 is provided on both sides in the width direction of the annular structure 10, the carcass portion 12 need not be continuous between both of the bead portions 13 and 13. Thus, as illustrated in FIG. 3, it is sufficient that the carcass portion 12 be provided on both sides in the direction (the width direction) parallel to the center axis (Y-axis) of a cylindrical structure 2 that includes at least the annular structure 10 and the rubber layer 11.

In the tire 1, in a meridian cross-section of the structure 2, an outer side 11so (tread surface of the tire 1) of the rubber layer 11 and the outer side 10so of the annular structure 10, except portions where a groove S is formed in the tread surface, preferably have the same form, and are parallel (including allowance and tolerance).

The annular structure 10 illustrated in FIGS. 2-1 and 2-2 is a metal structure. In other words, the annular structure 10 is made from a metal material. The metal material used for the annular structure 10 preferably has a tensile strength of not less than 450 N/m$^2$ and not more than 2,500 N/m$^2$, more preferably not less than 600 N/m$^2$ and not more than 2,400 N/m$^2$, and more preferably not less than 800 N/m$^2$ and not more than 2,300 N/m$^2$. When the tensile strength is within the range described above, sufficient strength and rigidity of the annular structure 10 can be ensured, and necessary toughness can be ensured. It is sufficient that the tensile strength of the metal material that can be used for the annular structure 10 be within the range described above, but preferably spring steel, high tensile steel, stainless steel, or titanium (including titanium alloy) is used. Of these, stainless steel is preferable because stainless steel has high corrosion resistance and stainless steel with a tensile strength that is within the range described above can be obtained easily.

A pressure resistance parameter is defined as a product of the tensile strength (MPa) and the thickness (mm) of the annular structure 10. The pressure resistance parameter is a parameter by which resistance against internal pressure of the gas that the tire 1 is filled with is measured. The pressure resistance parameter is set to be not less than 200 and not more than 1,700 and preferably not less than 250 and not more than 1,600. When within this range, a maximum usage pressure of the tire 1 can be ensured, and safety can be sufficiently ensured. Additionally, when within the range described above, it is not necessary to increase the thickness of the annular structure 10, and it is also not necessary to use a material with a high breaking strength, which is preferable for mass production. Durability against repeated bending can be ensured for the annular structure 10 because it is not necessary to increase the thickness of the annular structure 10. Additionally, the annular structure 10 and the tire 1 can be manufactured at a low cost because it is not necessary to use a material with a high breaking strength. When used for a passenger car, the pressure resistance parameter is preferably not less than 200 and not more than 1,000, and more preferably not less than 250 and not more than 950. When used as a truck/bus tire (TB tire), the pressure resistance parameter is preferably not less than 500 and not more than 1,700, and more preferably not less than 600 and not more than 1,600.

When manufacturing the annular structure 10 from stainless steel, it is preferable to use a JIS (Japanese Industrial Standards) G4303-classified martensitic stainless steel, ferritic stainless steel, austenitic stainless steel, austenitic-ferritic two-phase stainless steel, or precipitation hardening stainless steel. By using such a stainless steel, an annular structure 10 having superior tensile strength and toughness can be obtained. Additionally, of the stainless steels described above, precipitation hardening stainless steel (SUS631 or SUS632J1) is more preferable.

As illustrated in FIGS. 2-1 and 2-2, the annular structure 10 has a plurality of through-holes 10H that penetrates an inner circumferential surface and an outer periphery thereof. The rubber layer 11 is attached to the outer side in the radial direction and/or the inner side in the tire radial direction of the annular structure 10. The rubber layer 11 is attached to the annular structure 10 via chemical bonding with the annular structure 10. The through-holes 10H provide an effect of strengthening the physical bond between the annular structure 10 and the rubber layer 11. Therefore, bonding strength with the annular structure 10 is increased by chemical and physical effects (anchoring effects) and, as a result, the annular structure 10 is reliably affixed to the rubber layer 11. This leads to an enhancement in the durability of the tire 1.

A cross-sectional area of one of the through-holes 10H is preferably not less than 0.1 mm$^2$ and not more than 100 mm$^2$, more preferably not less than 0.12 mm$^2$ and not more than 80 mm$^2$, and even more preferably not less than 0.15 mm$^2$ and not more than 70 mm$^2$. When within this range, unevennesses in the carcass portion 12 are suppressed, and bonding by adhesion, specifically, chemical bonding can be sufficiently used. Furthermore, when within the range described above, the physical effect described above, specifically the anchoring effect, is most effective. Due to these effects, the bond between the annular structure 10 and the rubber layer 11 can be strengthened.

The form of the through-holes 10H is not limited, but a circular or elliptical form is preferable (the form is circular in this embodiment). Additionally, an equivalent diameter 4×A/C of the through-holes 10H (where C is a circumferential length of the through-holes 10H, and A is the opening area of the through-holes 10H) is preferably not less than 0.5 mm and not more than 10 mm. The through-holes 10H more preferably have a circular form and a diameter of not less than 1.0 mm and not more than 8.0 mm. When within this range, physical and chemical bonding can be used effectively and, therefore, the bond between the annular structure 10 and the rubber layer 11 will be stronger. As described hereinafter, the equivalent diameter or diameter of all of the through-holes 10H need not be the same.

A sum of the area of the through-holes 10H is preferably not less than 0.5% and not more than 30%, more preferably not less than 1.0% and not more than 20%, and even more preferably not less than 1.5% and not more than 15% of a surface area of the outer side in the radial direction of the annular structure 10. When within this range, strength of the annular structure 10 can be ensured while physical and chemical bonding are used effectively. As a result, the bond between the annular structure 10 and the rubber layer 11 will be stronger and necessary rigidity of the annular structure 10 can be ensured. As described hereinafter, spacing of the through-holes 10H may be equal or unequal. By using such a configuration, the footprint of the tire 1 can be controlled.

The annular structure 10 can be manufactured by abutting short sides of a rectangular plate material in which the plurality of through-holes 10H have been punched, and then welding. Thus, the annular structure 10 can be manufactured in a comparatively simple manner. Note that the method for manufacturing the annular structure 10 is not limited to this and, for example, the annular structure 10 may be manufactured by forming a plurality of holes in the outer peripheral portion of a cylinder and, thereafter, milling an interior of the cylinder.

The outer side 10so of the annular structure 10 and an inner side 11si of the rubber layer 11 are in contact with each other. In this embodiment, the annular structure 10 and the rubber layer 11 are affixed using, for example, an adhesive. As a result of such a structure, force can be transferred mutually between the annular structure 10 and the rubber layer 11. Methods for affixing the annular structure 10 and the rubber layer 11 are not limited to adhesives. Additionally, the annular structure 10 preferably is not exposed to the outer side in the radial direction of the rubber layer. Such a configuration will lead to the annular structure 10 and the rubber layer 11 being more reliably affixed. Furthermore, the annular structure 10 may be embedded in the rubber layer 11. In such a case as well, the annular structure 10 and the rubber layer 11 can be more reliably bonded.

The rubber layer 11 includes a rubber material including a synthetic rubber, a natural rubber, or a mixture thereof; and carbon, $SiO_2$ or the like, which is added to the rubber material as a reinforcing material. The rubber layer 11 is an endless belt-like structure. As illustrated in FIG. 1, in this embodiment, the rubber layer 11 has a plurality of grooves (main grooves) S in an outer side 11so. The rubber layer 11 may also have lug grooves in addition to the grooves S.

The carcass portion 12 is a strengthening member that, together with the annular structure 10, fulfills a role as a pressure vessel when the tire 1 is filled with air. The carcass portion 12 and the annular structure 10 support the load that acts on the tire 1 due to the internal pressure of the air that fills the interior of the tire 1, and withstand dynamic forces received by the tire 1 during traveling. In this embodiment, an inner liner 14 is provided on an inner side of the carcass portion 12 of the tire 1. The inner liner 14 suppresses the air filling the interior of the tire 1 from leaking. Each end of the carcass portion 12 has a bead portion 13 on the inner side thereof in the radial direction. The bead portions 13 mate with a rim of a wheel on which the tire 1 is attached. Note that the carcass portion 12 may mechanically bond with the rim of the wheel.

Figure 4:
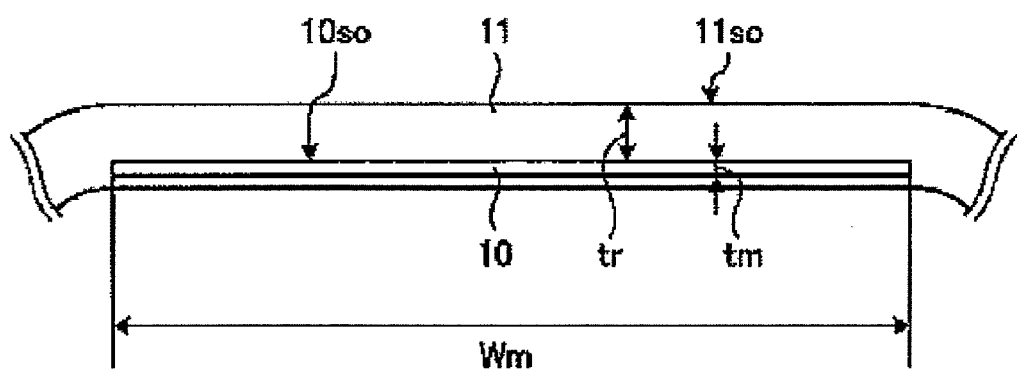
FIG. 4 is a meridian cross-sectional view of the annular structure and a rubber layer.

FIG. 4 is a meridian cross-sectional view of the annular structure 10 and the rubber layer 11. An elastic modulus of the annular structure 10 is preferably not less than 70 GPa and not more than 250 GPa, and more preferably not less than 80 GPa and not more than 230 GPa. Additionally, a thickness tm of the annular structure 10 is preferably not less than 0.1 mm and not more than 0.8 mm. When within this range, durability against repeated bending can be ensured while ensuring pressure resistance performance. A product of the elastic modulus and the thickness tm of the annular structure 10 (referred to as the "rigidity parameter") is preferably not less than 10 and not more than 500, and more preferably not less than 15 and not more than 400.

By configuring the rigidity parameter to be within the range described above, rigidity of the annular structure 10 in the meridian cross-section increases. As a result, when the tire 1 is filled with air and when the tire 1 makes ground contact with a road surface, deformations caused by the annular structure 10 in the meridian cross-section of the rubber layer 11 (tread portion) are suppressed. Therefore, viscoelastic energy loss of the tire 1 caused by the deformations is suppressed. Additionally, by configuring the rigidity parameter to be within the range described above, rigidity of the annular structure 10 in the radial direction decreases. As a result, the tread portion of the tire 1 pliably deforms at a ground contact portion between the tire 1 and the road surface, just as with conventional pneumatic tires. Due to such a function, the tire 1 eccentrically deforms while localized concentrations of strain and stress in the ground contact portion are avoided and, therefore, strain in the ground contact portion can be dispersed. Therefore, localized deformation of the rubber layer 11 in the ground contact portion is suppressed, resulting in ground contact area of the tire 1 being ensured and rolling resistance being reduced.

Furthermore, with the tire 1, because the in-plane rigidity of the annular structure 10 is great and the ground contact area of the rubber layer 11 is ensured, ground contact length in the circumferential direction can be ensured. Therefore, lateral forces, generated when a rudder angle is input, increase. As a result, the tire 1 can obtain high cornering power. Additionally, when the annular structure 10 is manufactured from a metal, most of the air that the interior of the tire 1 is filled with will not pass through the annular structure 10. This is beneficial as it simplifies managing the air pressure of the tire 1. Therefore, declines in the air pressure of the tire 1 can be suppressed even when usage of the tire 1 is such that the tire 1 is not filled with air for an extended period of time.

A distance tr (thickness of the rubber layer 11) between the outer side 10so of the annular structure 10 and the outer side 11so of the rubber layer 11 is preferably not less than 3 mm and not more than 20 mm. By configuring the distance tr to be within such a range, excessive deformation of the rubber layer 11 when cornering can be suppressed while ensuring riding comfort. The direction parallel to the center axis (Y-axis) of the annular structure 10 or, in other words, a dimension Wm (annular structure width) in the width direction of the annular structure 10 is preferably not less than 50% (W×0.5) and not more than 95% (W×0.95) of the total width (in a state where the tire 1 is assembled on a wheel having a JATMA stipulated rim width and inflated with air to 300 kPa) in the direction parallel to the center axis (Y-axis) of the tire 1 illustrated in FIG. 1. If Wm is less than W×0.5, rigidity in the meridian cross-section of the annular structure 10 will be insufficient, resulting in a reduction of the region that maintains eccentric deformation with respect to the tire width. As a result, the effect of reducing rolling resistance may decline and cornering power may decrease. Moreover, if Wm exceeds W×0.95, the tread portion may cause buckling deformation in the center axis (Y-axis) direction of the annular structure 10 when making ground contact, and this may lead to the deformation of the annular structure 10. By configuring Wm so that W×0.5≤Wm≤W×0.95, cornering power can be maintained while rolling resistance is reduced and, furthermore, deformation of the annular structure 10 can be suppressed.

With the tire 1, in the meridian cross-section illustrated in FIG. 1, the outer side 11so of the rubber layer 11 or, in other words, the profile of the tread surface, except the portions where the groove S is formed (in this case, main grooves Sc), preferably has the same form as the outer side 10so of the annular structure 10. As a result of such a configuration, when the tire 1 makes ground contact or is rolling, the rubber layer 11 (tread portion) and the annular structure 10 deform in substantially the same manner. Therefore, deformation of the rubber layer 11 of the tire 1 is reduced, and this leads to a reduction in viscoelastic energy loss and a further reduction in rolling resistance.

If the outer side 11so of the rubber layer 11 and the outer side 10so of the annular structure 10 protrude facing outward in the radial direction of the tire 1 or, alternately protrude facing inward in the radial direction of the tire 1, pressure distribution in the ground contact portion of the tire 1 will become uneven. As a result, localized concentrations of strain and stress may be generated in the ground contact portion, and localized deformation of the rubber layer 11 may occur in the ground contact portion. In this embodiment, in tire 1, as illustrated in FIG. 3, the outer side 11so of the rubber layer 11 (the tread surface of the tire 1) and the outer side 10so of the annular structure 10 have the same form (preferably parallel) and, furthermore, preferably are parallel (including allowance and tolerance) to the center axis (Y-axis) of the rubber layer 11 and the annular structure 10 (i.e. the structure 2). Due to such a structure, the ground contact portion of the tire 1 can be configured to be substantially flat. With the tire 1, pressure distribution in the ground contact portion is uniform and, therefore, localized concentration of strain and stress in the ground contact portion is suppressed and localized deformation of the rubber layer 11 in the ground contact portion is suppressed. As a result, viscoelastic energy loss is reduced and, therefore, rolling resistance of the tire 1 is also reduced. Additionally, with the tire 1, localized deformation of the rubber layer 11 in the ground contact portion is suppressed and, therefore, the ground contact area can be ensured and, simultaneously, the ground contact length in the tire circumferential direction can be ensured. Therefore, with the tire 1, cornering power can also be ensured.

In this embodiment, the form of the rubber layer 11 in the meridian cross-section is not particularly limited provided that the outer side 11so of the rubber layer 11 and the outer side 10so of the annular structure 10 are parallel to the center axis (Y-axis). For example, the form of the rubber layer 11 in a meridian cross-section may be a trapezoidal shape or a parallelogram shape. When the form of the rubber layer 11 in the meridian cross-section is trapezoidal, an upper bottom or a lower bottom of the trapezoid may be the outer side 11 so of the rubber layer 11. In either case, it is sufficient that only the portion of the annular structure 10 be parallel to the profile (except the portions where the groove is formed) of the tread surface of the tire 1. Next, modified examples of the annular structure 10 will be described.

Modified Examples of the Annular Structure

Figures 1, 5:
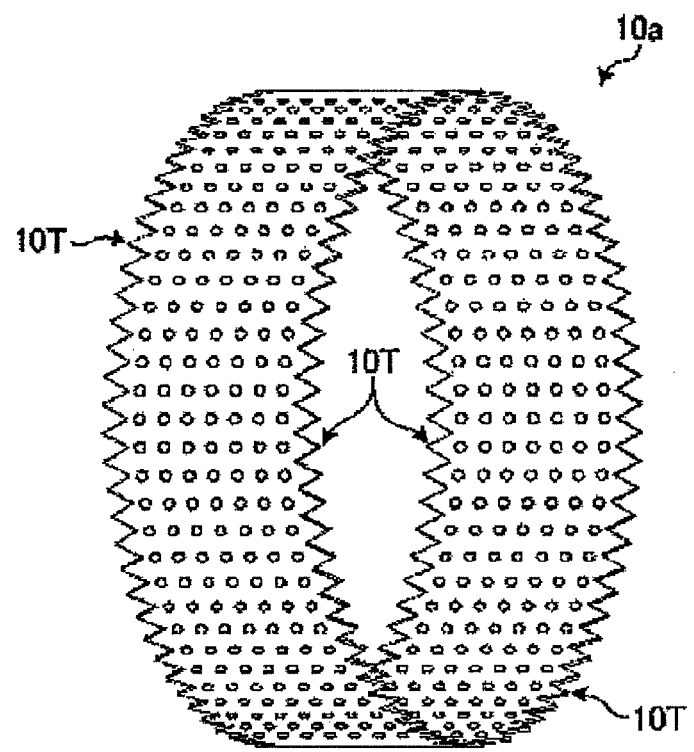
Figures 2, 5:
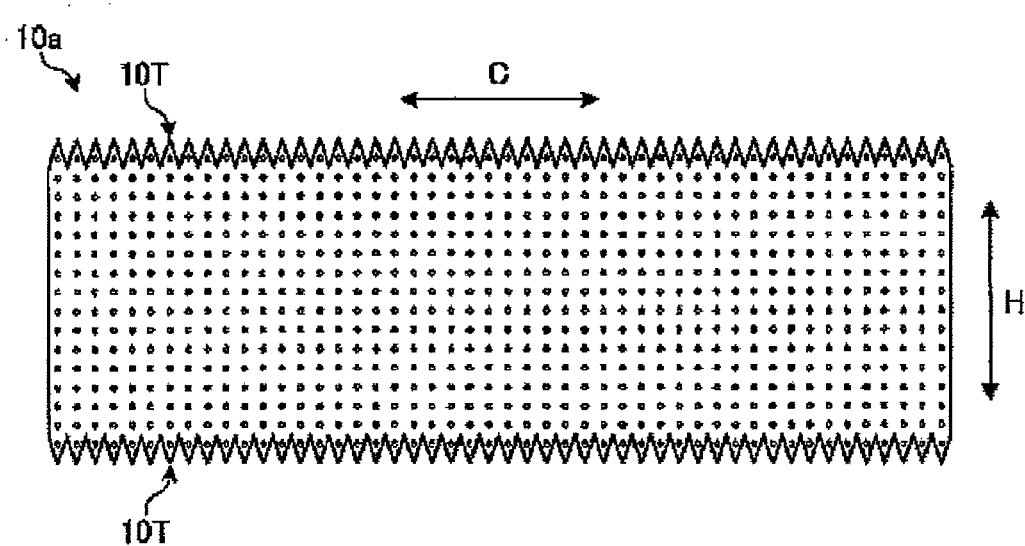
Figures 3, 5:
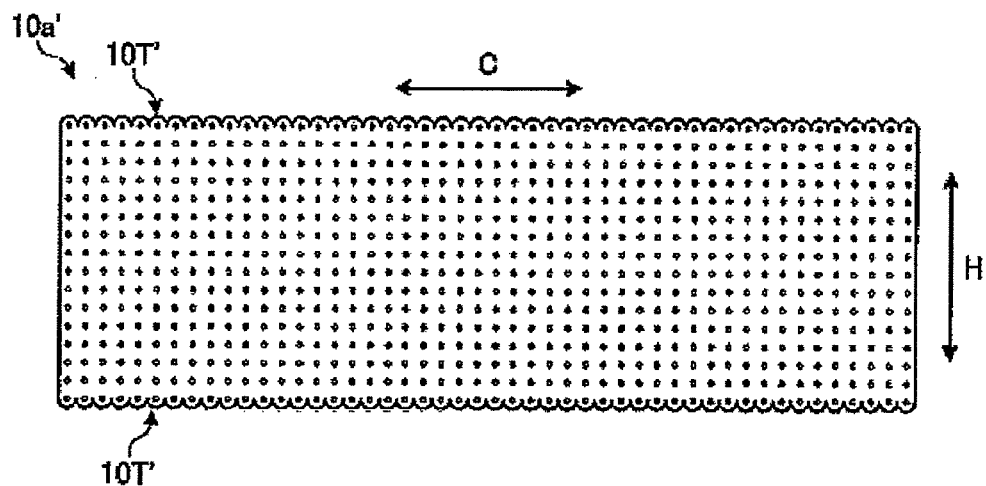
Figures 4, 5:
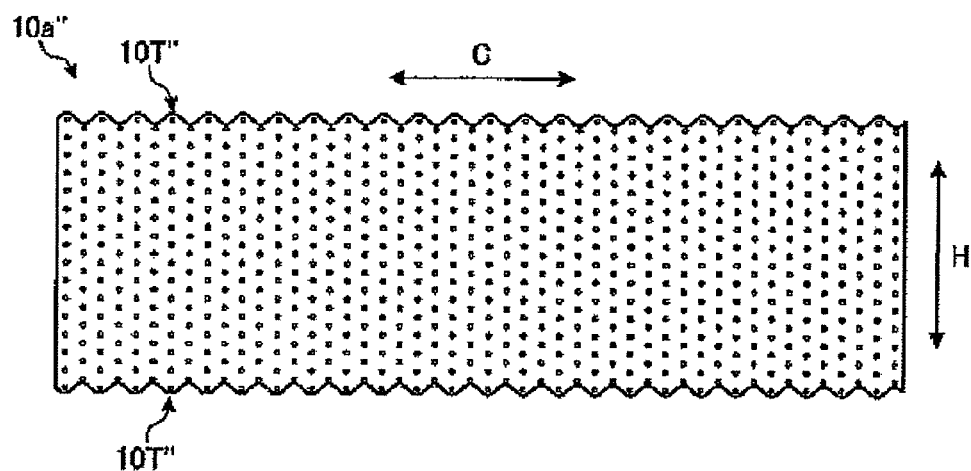
Figure 6:
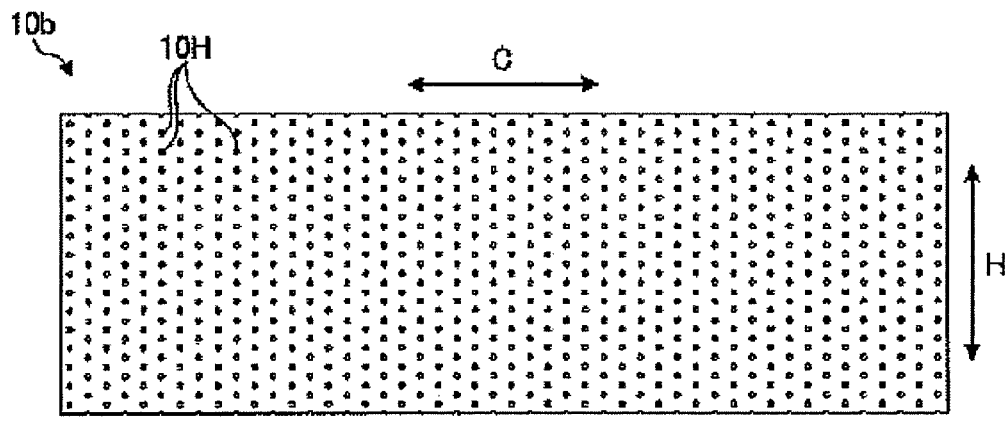
FIG. 6 is a drawing illustrating a modified example of the annular structure included in the tire according to the first embodiment.

FIGS. 5-1 and 5-2 are drawings illustrating a modified example of the annular structure included in the tire according to the first embodiment. FIG. 5-2 is a plan view of the annular structure; arrow C indicates the circumferential direction of an annular structure 10a; and W indicates the width direction (same hereinafter). With the annular structure 10 of the tire 1 described above, both edges on the sides in the width direction are formed so as to be straight, but, as with the annular structure 10a of this modified example, both edges on the sides in the width direction may be provided with recesses and protrusions 10T having a serrated blade form. The rubber layer illustrated in FIG. 3 is attached to the outer side in the radial direction of the annular structure 10a, and the recesses and protrusions 10T function to strengthen the bonding between the annular structure 10a and the rubber layer 11. Particularly, the recesses and protrusions 10T strengthen the physical bond and increase the contact area with the rubber layer 11. As a result the adhesion strength between the rubber layer 11 and the annular structure 10a can be increased. Therefore, the annular structure 10a with the recesses and protrusions 10T is preferable because the bond with the rubber layer 11 will be more reliable and durability will be enhanced. Additionally, the recesses and protrusions 10T can mitigate compression stress acting on both edges in the width direction of the annular structure 10a and, therefore, buckling in the circumferential direction of the ground contact portion of the tire 1 can be suppressed. This leads to an enhancement in the durability of the tire 1. The recesses and protrusions 10T may be spaced equally, but when uniformity-order harmonic frequencies are generated, the recesses and protrusions 10T are preferably spaced unequally.

FIGS. 5-3 and 5-4 are plan views illustrating a modified example of an annular structure including recesses and protrusions on both edges in the width direction. As in an annular structure 10a' illustrated in FIG. 5-3, recesses and protrusions 10T' may be formed from continuous semicircles. Depending on the material of the carcass portion 12 or the rubber layer 11 of the tire 1, an edge of the serrated blade form may cause stress to concentrate in the carcass portion 12 or the rubber layer 11 (due to being incisive) during use over an extended period of time, due to deformations that occur when the tire 1 is rolling. As a result, the durability of the carcass portion 12 or the rubber layer 11 may decline. In such a case, the recesses and protrusions 10T' illustrated in FIG. 5-3 are preferable.

Additionally, as in the annular structure 10a" illustrated in FIG. 5-4, recesses and protrusions 10T" may have a wave-like form. Furthermore, when a decline in durability of the annular structure 10a is expected due to repeated bending because the recesses of the recesses and protrusions 10T (e.g. valleys) having a serrated blade form such as those illustrated in FIG. 5-2 are incisive (varies depending on the material and thickness of the annular structure 10a), the recesses and protrusions 10T" illustrated in FIG. 5-4 are preferable.

FIGS. 6 to 10 are drawings illustrating modified examples of the annular structure included in the tire according to the first embodiment. These annular structures are preferably selected for use based on the characteristics demanded from the tire. A plurality of the through-holes 10H are arranged in the width direction (direction indicated by the "H" arrow) and a plurality of the through-holes 10H are arranged in a staggered manner in the circumferential direction (direction indicated by the "C" arrow) in an annular structure 10b illustrated in FIG. 6. Compared with the annular structure 10 of FIG. 2-2, the spacing between the through-holes 10H (spacing between six adjacent holes) in the annular structure 10b can be made uniform. Therefore, a maximum density of the through-holes 10H, when viewed planarly, can be obtained. When greater adhesive strength is desired, the annular structure 10b is preferable.

Figure 7:
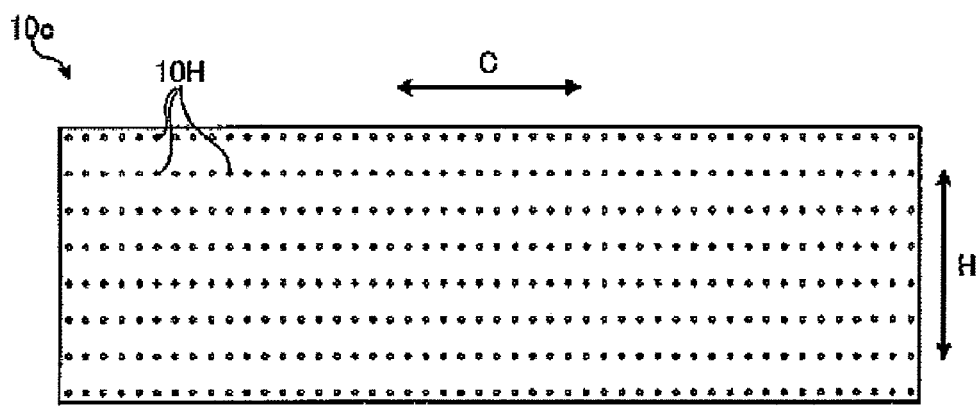
FIG. 7 is a drawing illustrating a modified example of the annular structure included in the tire according to the first embodiment.

The arrangement spacing of the plurality of through-holes 10H is greater in the width direction than in the circumferential direction in an annular structure 10c illustrated in FIG. 7. This annular structure 10c is useful when greater bending rigidity in the width direction is desired. When, for example, the bending rigidity in a tread cross-section direction is increased, mid-range frequency road noise (around 300 Hz) is reduced. Therefore, the annular structure 10c is useful when reduced mid-range frequency road noise is desired.

Figure 8:
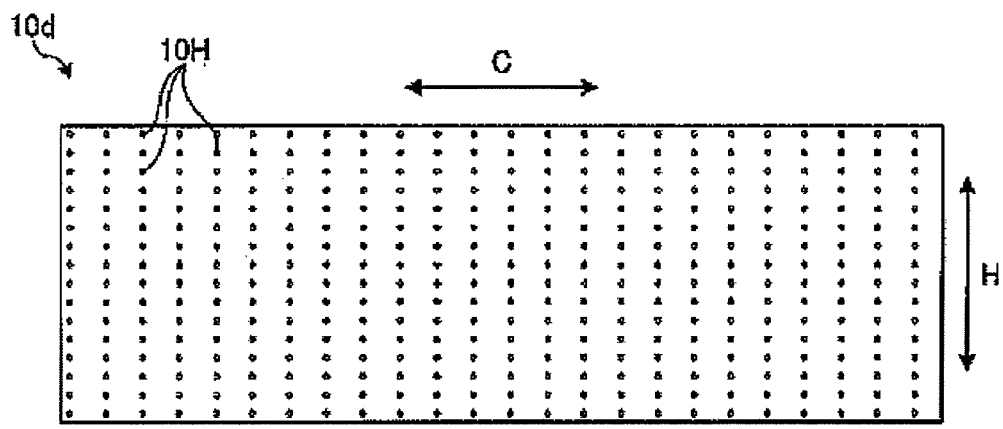
FIG. 8 is a drawing illustrating a modified example of the annular structure included in the tire according to the first embodiment.

The arrangement spacing of the plurality of through-holes 10H is greater in the circumferential direction than in the width direction in an annular structure 10d illustrated in FIG. 8, which is opposite that of the annular structure 10c illustrated in FIG. 7. The annular structure 10d is useful when greater bending rigidity in the circumferential direction is desired. When, for example, circumferential direction bending rigidity of the tread is increased, steering stability is enhanced. Therefore, the annular structure 10d is useful when enhanced steering stability is desired.

Figure 9:
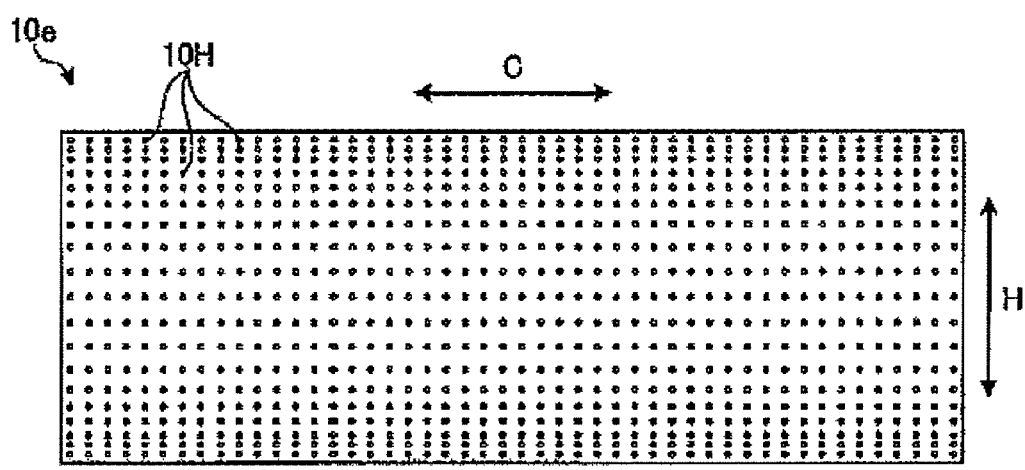
FIG. 9 is a drawing illustrating a modified example of the annular structure included in the tire according to the first embodiment.

The arrangement spacing of the plurality of through-holes 10H is constant in the circumferential direction and varies in the width direction in an annular structure 10e illustrated in FIG. 9. More specifically, with the annular structure 10e, the spacing of the plurality of through-holes 10H increases gradually from the outer sides in the width direction toward the center in the width direction. In cases, for example, where wearing of the tire 1 progresses and there is a tendency for shoulder wear (relatively speaking, shoulder portions wear first) to occur, the gauge of the tread rubber (the rubber layer 11) becomes uneven in the width direction. Therefore, in a cross-section of the ground contact portion, the annular structure may become unable to maintain a state parallel with the center axis (the Y-axis) and, this may lead to a decline in the durability of the tread rubber. Compared to the annular structure 10 of FIG. 2-2, the bending rigidity of the edge portions (i.e. the shoulder portions of the tire 1) in the annular structure 10e has been lowered. Therefore, compared to the annular structure 10 of FIG. 2-2, the annular structure 10e has a lower bending rigidity and, thus can flexibly follow the variations in the gauge dimension of the tread rubber (the rubber layer 11). As a result, declines in the durability of the tread rubber can be effectively suppressed. Additionally, with the annular structure 10e, the through-holes 10H may be disposed sparsely in the center portion and densely in the shoulder portion so that both a penetration ratio (described hereinafter) can be maintained and declines in the durability of the tread rubber caused by the variations in the gauge dimension can be suppressed.

Figure 10:
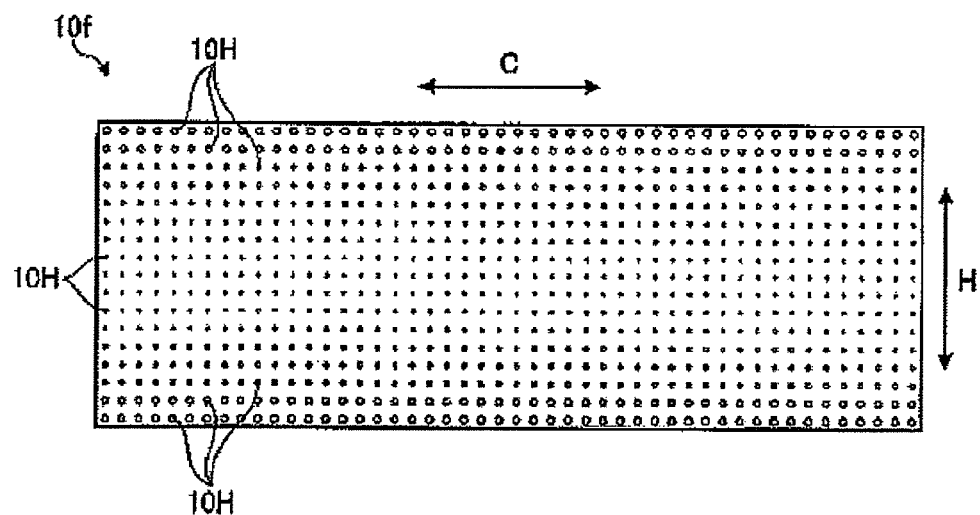
FIG. 10 is a drawing illustrating a modified example of the annular structure included in the tire according to the first embodiment.
Figure 11:
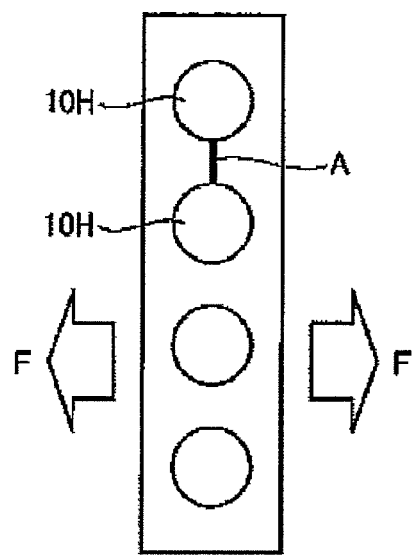
FIG. 11 is an explanatory drawing for calculating an opening ratio of the through-holes.

The diameter or equivalent diameter of the plurality of through-holes 10H varies depending on the position of the through-holes 10H in the width direction in an annular structure 10f illustrated in FIG. 10. More specifically, with the annular structure 10f, the diameter or equivalent diameter of the plurality of through-holes 10H decreases gradually from the outer sides in the width direction toward the center in the width direction. The annular structure 10f can display the effects of the annular structure 10e of FIG. 9 by changing the diameter of the through-holes 10H and not the density of the through-holes 10H. The annular structure 10f is useful when greater adhesive strength in the shoulder portion than with the annular structure 10e of FIG. 9 is desired.

Figure 12:
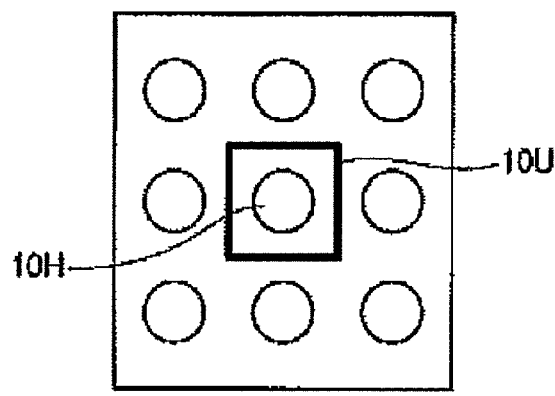
FIG. 12 is an explanatory drawing for calculating the opening ratio of the through-holes.
Figure 13:
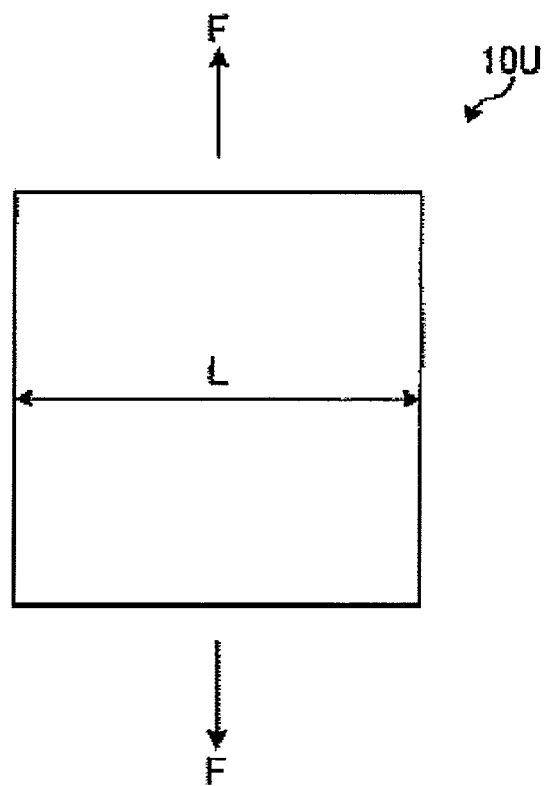
FIG. 13 is an explanatory drawing for calculating the opening ratio of the through-holes.
Figure 14:
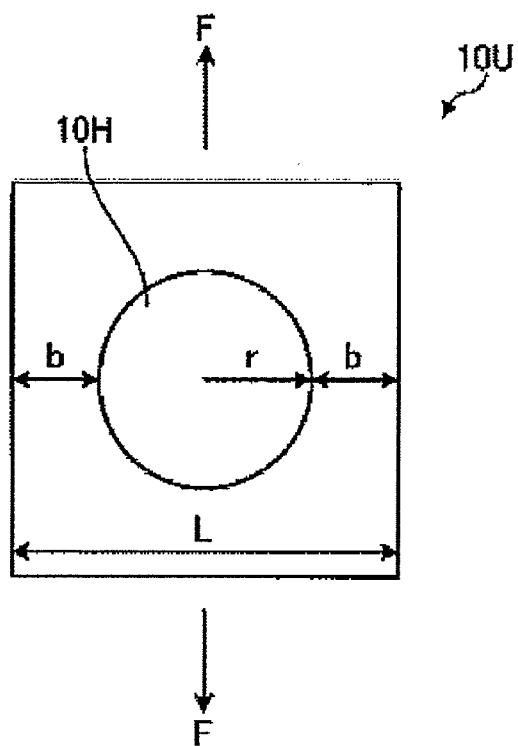
FIG. 14 is an explanatory drawing for calculating the opening ratio of the through-holes.
Figure 15:
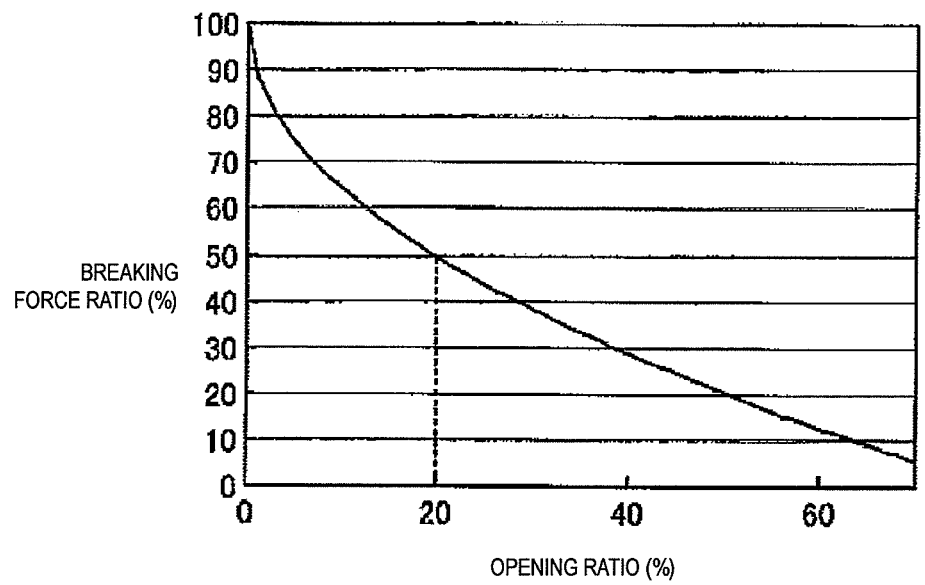
FIG. 15 is a graph showing the relationship between the opening ratio and the breaking force ratio.

FIGS. 11 to 14 are explanatory drawings for calculating an opening ratio of the through-holes. FIG. 15 is a graph showing the relationship between the opening ratio and the breaking force ratio. Next, the opening ratio of the through-holes 10H included in the annular structure 10 will be described. The annular structure 10 illustrated in FIG. 2 has the through-holes 10H and, in this case, a cross-sectional area S (calculated by multiplying a distance between adjacent through-holes 10H and 10H by a thickness of the annular structure 10) is subjected to tensile force F. This portion is a portion expected to break due to the tensile force F. As illustrated in FIG. 12, a unit section 10U is defined by a through-hole 10H and the eight through-holes 10H surrounding said through-hole 10H. The unit section 10U is used in calculating the breaking strength in cases where the annular structure 10 does not have the through-holes 10H and in cases where the annular structure 10 does have the through-holes 10H. When the distance between adjacent through-holes 10H is "b", and a radius of the through-holes 10H is "r", the unit section 10U is a square region where 2×(b+r)=L expresses a length of one side of said square region.

The relationship between a cross-sectional area ratio of the expected breaking plane and the opening ratio (area ratio with respect to a state where the through-holes 10H are not provided) in the unit section 10U was sought. Note that it was hypothesized that breaking force would be proportional to the cross-sectional area S. In each of the unit sections 10U of FIGS. 13 and 14, a thickness of the plate was defined as "t". When the through-holes 10H are not present (FIG. 13), stress σL of the breaking plane can be expressed by formula (1). When the through-holes 10H are present (FIG. 14), stress σB of the breaking plane can be expressed by formula (2). "B" is defined as $2 \times b = L - 2 \times r = L - 2 \times \sqrt{(\alpha/\pi)}$. "α" is the opening ratio and is defined as $\pi r^2/L^2$.

$$\sigma L = F/(L \times t) \quad (1)$$

$$\sigma B = F/(B \times t) \quad (2)$$

The breaking force ratio σL/σB is defined as $B/L = 1 - 2 \times \sqrt{(\alpha/\pi)}$. This relationship is shown in FIG. 15. From FIG. 15, it is understood that when the opening ratio α exceeds 20%, breaking force (breaking force ratio) will be less than or equal to half, and there is a risk that performance as a pressure vessel of the annular structure 10 will be insufficient. In this case, it is necessary to increase the thickness of the annular structure 10, but when doing so, durability against repeated bending deformation declines. Therefore, the opening ratio α of the annular structure 10 having the through-holes 10H is preferably limited to not more than 20%.

As described above, the pneumatic tire according to this embodiment has an annular structure with a rigidity parameter (defined as the product of the elastic modulus and the thickness) that is not less than 10 and not more than 500, and a rubber layer disposed on the outer side of the annular structure. Due to such a structure, the tire of this embodiment eccentrically deforms while localized concentrations of strain and stress of the rubber layer in the ground contact portion are avoided and, therefore, strain in the ground contact portion can be dispersed. As a result, with the tire of this embodiment, localized deformation of the rubber layer in the ground contact portion is suppressed and, therefore, concentrations of strain and stress in the ground contact portion are dispersed and rolling resistance is reduced. Thus, with this embodiment, a structure whereby the rolling resistance of a pneumatic tire is reduced can be provided. Moreover, by using an annular structure having a tensile strength of not less than 450 N/m² and not more than 2,500 N/m², sufficient strength and rigidity of the annular structure can be ensured, and necessary toughness can be ensured. As a result, sufficient pressure resistance performance of the annular structure can be ensured.

Furthermore, because the rubber layer and the annular structure are bonded due to the through-holes being provided in the annular structure, physical bonding is utilized in addition to chemical bonding to reliably and firmly affix the two constituents together. As a result, the durability of the pneumatic tire according to this embodiment is enhanced. Additionally, as a result of the structure described above, with the pneumatic tire according to this embodiment, when the rubber layer becomes worn, the rubber layer can be removed from the annular structure and a new rubber layer can be attached to the annular structure. Thus, retreading is facilitated. With the pneumatic tire according to this embodiment, provided that defects are not produced, the carcass and the annular structure can be used multiple times. As a result, waste components are reduced and environmental impact is lightened. Furthermore, with the pneumatic tire according to this embodiment, the annular structure is formed by forming a plate-like member into a cylindrical form, and the annular structure is disposed so as to surround the space filled with air. As a result, with the pneumatic tire according to this embodiment, the annular structure prevents the intrusion of foreign objects from the road contact surface (outer side of the rubber layer) into the space filled with air. Therefore, the pneumatic tire according to this embodiment has a benefit of not being prone to punctures.

Products provided with the same configuration as that described in this embodiment provide the same functions and effects as those provided by this embodiment. Moreover, the configuration of this embodiment can be applied, as desired, as described below.

Second Embodiment

Figures 1, 16:
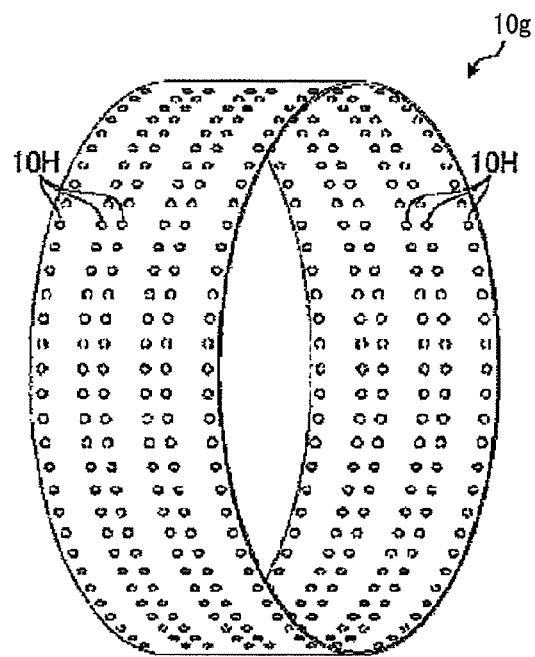
Figures 2, 16:
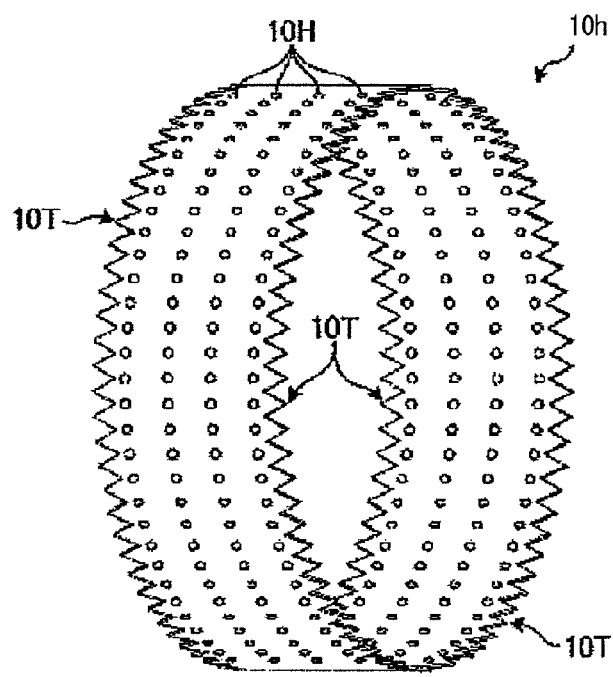

FIG. 16-1 is a perspective view of an annular structure included in the tire according to a second embodiment. FIG. 16-2 is a perspective view of a modified example of the annular structure included in the tire according to the second embodiment. Distribution of the through-holes 10H in an annular structure 10g of this embodiment and an annular structure 10h of a modified example thereof differs by position. In this embodiment, the annular structure 10g is not limited to the example illustrated in FIG. 16-1. For example, as with the annular structure 10*h* illustrated in FIG. 16-2, recesses and protrusions 10T having a serrated blade form may be provided on both sides in the width direction of the annular structure 10*g*. The rubber layer 11 illustrated in FIG. 4 is attached to the outer side in the radial direction of the annular structure 10*g*, and the recesses and protrusions 10T function to strengthen the bonding between the annular structure 10*h* and the rubber layer 11. Therefore, providing the annular structure 10*h* with the recesses and protrusions 10T is preferable because the annular structure 10*h* and the rubber layer 11 will be more reliably affixed and durability will be enhanced. Additionally, the recesses and protrusions 10T can mitigate compression stress acting on both edges in the width direction of the annular structure 10*h* and, therefore, buckling in the circumferential direction of the ground contact portion of the tire 1 can be suppressed. This leads to an enhancement in the durability of the tire 1. The recesses and protrusions 10T may be spaced equally, but when uniformity-order harmonic frequencies are generated, the recesses and protrusions 10T are preferably spaced unequally.

Figure 17:
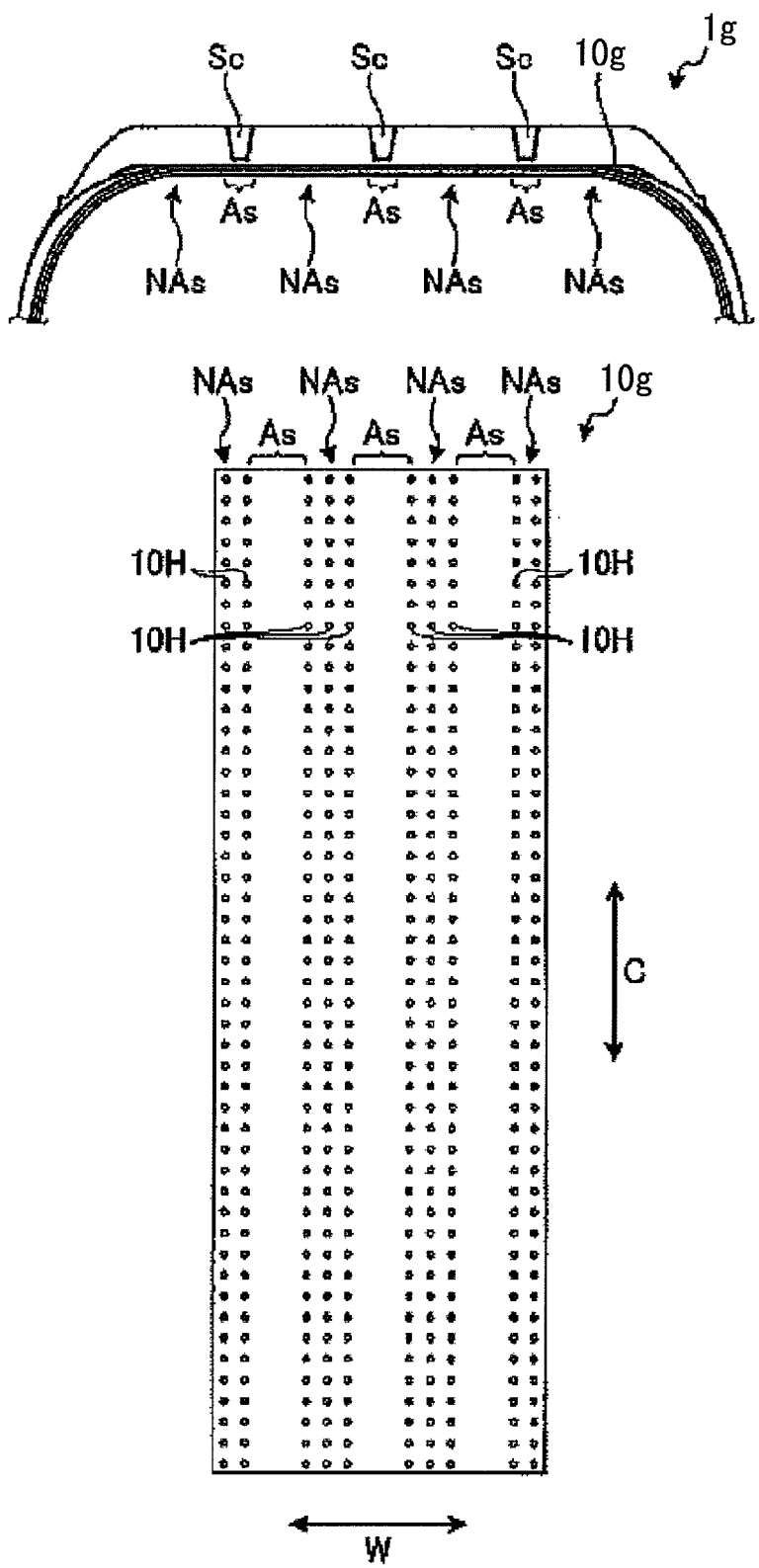
FIG. 17 is an explanatory drawing illustrating a distribution of the through-holes of the annular structure included in the tire according to the second embodiment.
Figure 18:
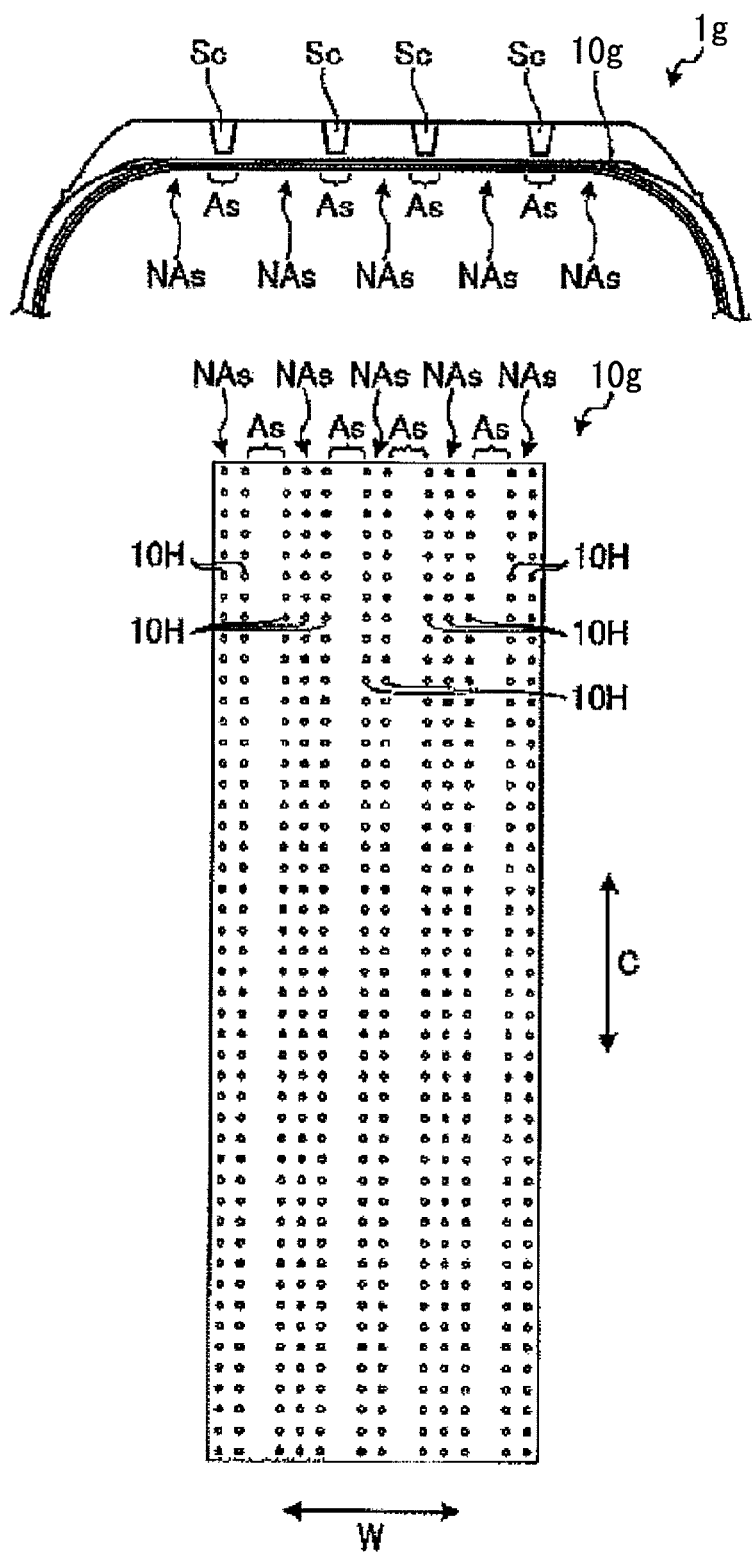
FIG. 18 is an explanatory drawing illustrating a distribution of the through-holes of the annular structure included in the tire according to the second embodiment.
Figure 19:
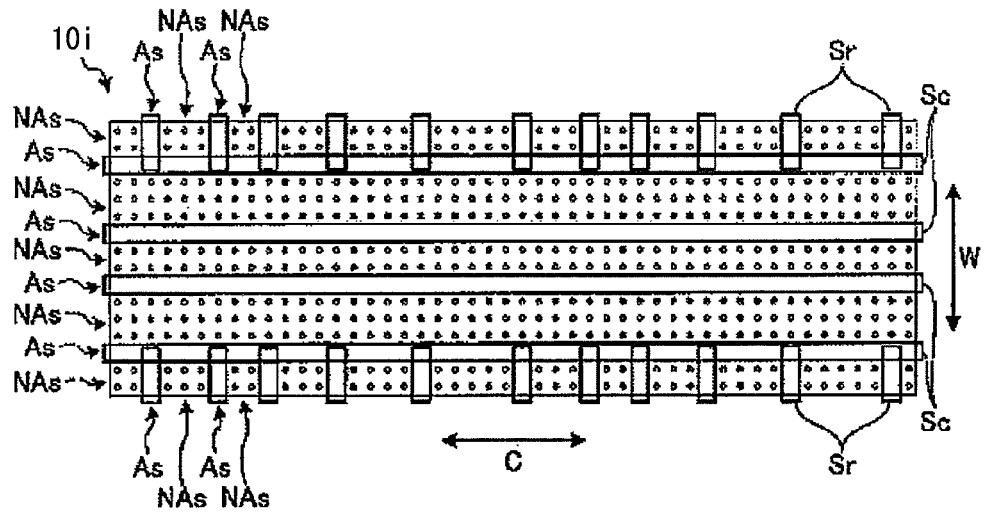
FIG. 19 is an explanatory drawing illustrating a distribution of the through-holes of the annular structure included in the tire according to the second embodiment.
Figure 20:
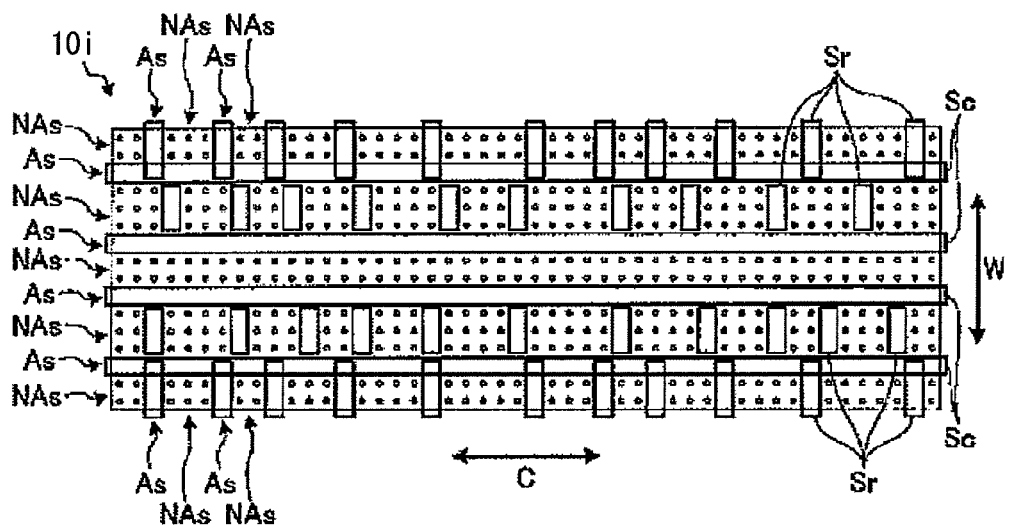
FIG. 20 is an explanatory drawing illustrating a distribution of the through-holes of the annular structure included in the tire according to the second embodiment.

FIGS. 17 to 20 are explanatory drawings illustrating distributions of the through-holes of the annular structure included in the tire according to the second embodiment. In the drawings, "W" indicates the width direction of the annular structure and "C" indicates the circumferential direction (same in the following examples as well). In this embodiment, with the annular structure 10*g*, at least the opening ratio of the through-holes 10H in a region As (groove region) where a groove (main groove Sc in the examples illustrated in FIGS. 17 and 18) is provided is lower than that in a region NAs (groove vicinity region) in a vicinity of the groove. Tire 1*g* illustrated in FIG. 17 is an example having three main grooves (circumferential grooves) Sc, and tire 1*g* illustrated in FIG. 18 is an example having four main grooves Sc. Tire 1*g* illustrated in FIG. 19 is an example having four main grooves (circumferential grooves) Sc and a plurality of lug grooves Sr on both sides in the width direction. Tire 1*g* illustrated in FIG. 20 is an example having four main grooves Sc and a plurality of lug grooves Sr on both sides in the width direction and in a center portion. In these examples, the through-holes 10H are not provided in the groove region As of the annular structure 10*g*, but the through-holes 10H are provided in the groove vicinity region NAs. As a result, the opening ratio of the through-holes 10H in the groove region As of the annular structure 10*g* is less than that in the groove vicinity region NAs.

Generally, portions of tires where grooves are provided have low bending rigidity. In this embodiment, with the annular structure 10*g*, the through-holes 10H beneath the grooves are not provided or are reduced or, in other words, the opening ratio of the through-holes 10H in the groove region As is configured so as to be less than that in the groove vicinity region NAs. Therefore, bending rigidity of the groove region As can be increased so as to be greater than that in the groove vicinity region NAs. As a result, unevennesses in the bending rigidity throughout an entirety of the tire 1*g* can be suppressed and durability and travelling stability can be enhanced. The amount of variance in the opening ratio is preferably adjusted as desired based on the characteristics of the tire to be enhanced.

If the through-holes 10H are disposed in the groove region As, rubber that becomes the tread portion will be pressed on by protrusions of the vulcanization mold corresponding to the grooves, and, as a result, the rubber will flow inward in the tire radial direction of the annular structure 10*g*, which may lead to vulcanization defects. By configuring the opening ratio of the through-holes 10H in the groove region As to be less than that in the groove vicinity region NAs, the rubber can be prevented from flowing inward in the radial direction of the annular structure 10*g*. As a result, vulcanization defects can be suppressed and, therefore, quality and yield of the manufactured tire 1*g* can be improved.

Note that the opening ratio is preferably lower in the vicinity of the groove region, and not just in the groove region As or in the region beneath the groove (i.e. the projected region of the groove on the annular structure 10*g*). When the groove is a main groove Sc, the vicinity of the groove region As is a region having a width equal to a sum of a width of the main groove Sc and a maximum of 15 mm on each side in the width direction thereof. When the groove is a lug groove Sr, the vicinity of the groove region As is a region having a width equal to a sum of a width of the lug groove Sr and a maximum of 10 mm on each side in the width direction thereof.

With the annular structure 10*g*, a proportion of a total of the opening area of the through-holes 10H to a surface area of the outer side in the radial direction in a case where the annular structure 10*g* does not include the through-holes 10H, is not less than 1% and not more than 30% in a region in a vicinity of a circumferential groove or a main groove Sc, (the groove vicinity region NAs), and not less than 0.5% and not more than 15% in a region where the main groove Sc is provided (the groove region As). If the groove vicinity region NAs of the main groove Sc is within this range, bonding between the annular structure 10*g* and the rubber layer 11 can be strengthened while maintaining the bending rigidity enhancement effect of the annular structure 10. As a result, performance and durability of the tire 1*g* can be ensured.

Figure 21:
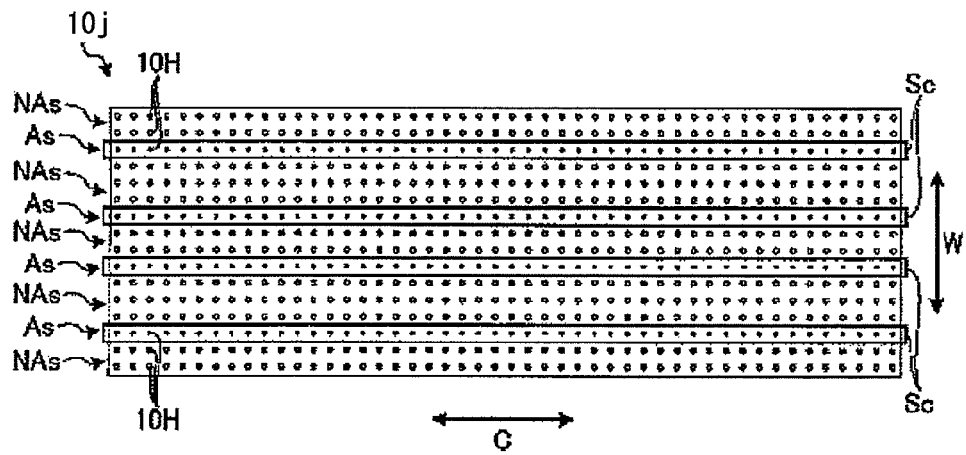
FIG. 21 is a plan view illustrating a modified example of the annular structure included in the tire according to the second embodiment.
Figure 22:
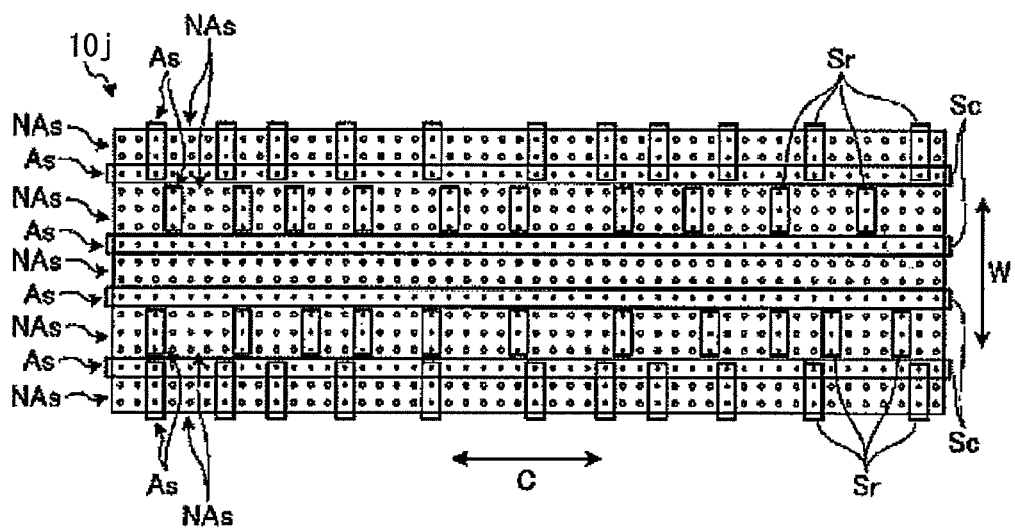
FIG. 22 is a plan view illustrating a modified example of the annular structure included in the tire according to the second embodiment.

FIGS. 21 and 22 are plan views illustrating a modified example of the annular structure included in the tire according to the second embodiment. FIG. 21 illustrates an annular structure 10*i* corresponding with a tire having only the main grooves Sc. FIG. 22 illustrates an annular structure 10*j* corresponding with a tire having both the main grooves Sc and the lug grooves Sr. The arrangement spacing of the through-holes 10H in the annular structures 10*i* and 10*j* is the same, but the area of the through-holes 10H in the groove region As is less than the area of the through-holes 10H in the groove vicinity region NAs. Thus, the opening ratio of the through-holes 10H in the groove region As of the annular structures 10*i* and 10*j* is less than that in the groove vicinity region NAs. With this configuration, the same functions and effects provided by the annular structure 10*g* described above can be obtained.

This embodiment can provide the same functions and effects as those provided by the first embodiment. Furthermore, in this embodiment, with the annular structure, the opening ratio of the through-holes in at least a region corresponding to the region where the grooves are provided in the tread portion of the tire is less than that in a region corresponding to a region in the vicinity of the region where the grooves are provided in the tread portion. Thus, with the tire according to this embodiment, declines in bending rigidity in portions were the grooves are provided is suppressed and performance and durability of the tire can be ensured.

Third Embodiment

In the third embodiment, states when vulcanizing when manufacturing the pneumatic tire according to the first embodiment or the second embodiment will be described. FIGS. 23-1 to 26-2 are schematic views illustrating states when vulcanizing a tire in a vulcanization mold. These drawings will be used to describe a method for manufacturing the pneumatic tire according to this embodiment. Hereinafter, the tire 1 according to the first embodiment is used as an example but the tire according to the second embodiment is the same.

Figures 1, 23:
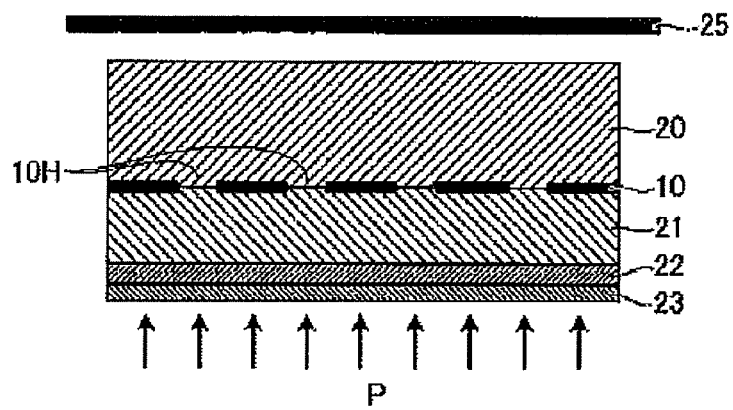
Figures 2, 23:
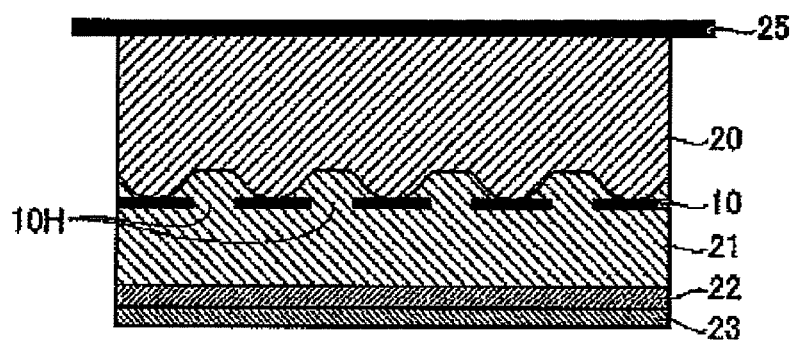

First, a cylindrical annular structure 10 (see FIG. 2-1) having a plurality of through-holes 10H is obtained. Next, non-vulcanized rubber is disposed on an outer side in a radial direction and on an inner side in the radial direction of the annular structure 10, respectively, and a green tire is fabricated. A second rubber 21 disposed on the inner side in the tire radial direction is rubber that is mainly used for the purpose of adhesion to the annular structure 10. As illustrated in FIG. 23-1, the green tire is a laminate constituted by a first rubber 20 (non-vulcanized), the second rubber 21 (non-vulcanized), the annular structure 10, a carcass 22 (non-vulcanized), and an inner liner 23 (non-vulcanized). When vulcanizing, the green tire is placed inside a vulcanization mold 25. The first rubber 20 and the second rubber 21 become the rubber layer 11 illustrated in FIG. 1 after vulcanization. The first rubber 20 and the second rubber 21 are in contact via the plurality of through-holes 10H included in the annular structure 10.

In this state, the green tire is pressed and heated by applying pressure P to the laminate from the inner liner 23 side toward the vulcanization mold 25 using a vulcanization bladder or the like. Because the elastic modulus of the annular structure 10 is high, swelling in the radial direction due to the pressure of vulcanization will not easily occur. Therefore, when applying pressure to the laminate, the pressure of the vulcanization bladder or the like from the inner liner 23 side does not easily transfer through to the first rubber 20 that becomes the tread portion, and vulcanization defects or the like may occur. In this embodiment, the second rubber 21 is disposed on the inner side in the tire radial direction of the annular structure 10 and, as illustrated in FIG. 23-2, due to the pressure of the vulcanization bladder or the like, the second rubber 21 is passed through the through-holes 10H included in the annular structure 10. Moreover, due to the pressing on the outer side in the radial direction of the annular structure 10, pressure can be applied to the first rubber 20 that becomes the tread portion. As a result, vulcanization defects and the like can be suppressed and quality and yield of the manufactured tire 1 can be improved. Additionally, when vulcanizing, the second rubber 21 passed through the through-holes 10H of the annular structure 10 and bonds with the first rubber 20. As a result, with the annular structure 10, the first rubber 20 and the second rubber 21 can be strongly bonded due to the anchoring effect of the second rubber 21 that was passed through the through-holes 10H. In this method, the second rubber 21, which is used mainly for the purpose of adhesion, is disposed only on a face of the inner side in the tire radial direction of the annular structure 10, and vulcanization is carried out such that the annular structure 10 is sandwiched by adhesive rubber layers. In this method, the composition of the second rubber 21 is preferably one that has excellent adhesion with the annular structure 10.

Figures 1, 24:
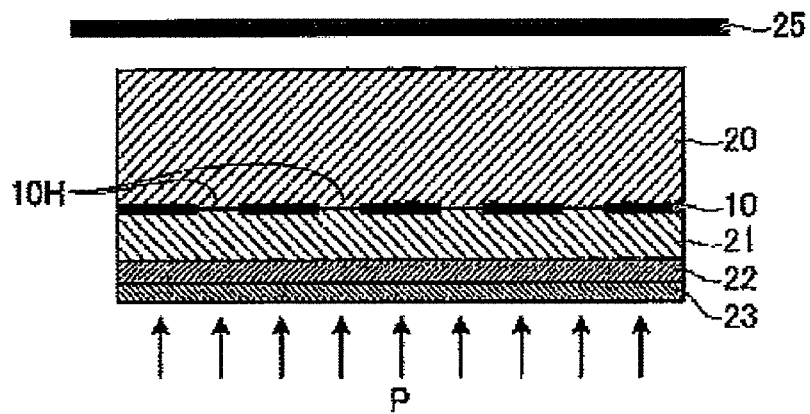
Figures 2, 24:
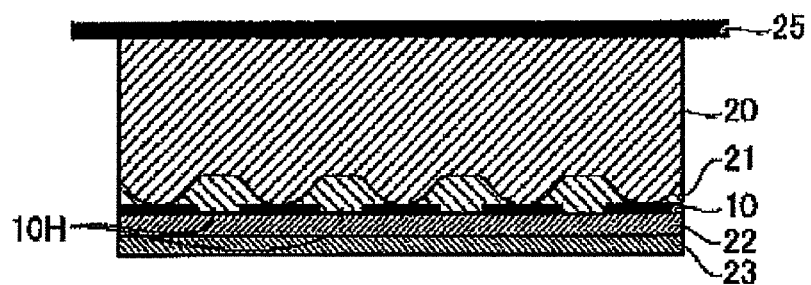

FIGS. 23-1 and 23-2 illustrate examples in which a portion of the second rubber 21 passes through the through-holes 10H and migrates to the first rubber 20 side; and where, after vulcanization, the annular structure 10 is disposed between the first rubber 20 and the second rubber 21. FIGS. 24-1 and 24-2 illustrate examples in which all of the second rubber 21 passes through the through-holes 10H and migrates to the first rubber 20 side; and where, after vulcanization, the annular structure 10 is disposed between the first rubber 20 and the carcass 22. Here, the amount of the second rubber 21 that migrates can be adjusted by adjusting a thickness of the second rubber 21 or the pressure P when vulcanizing. As described above, the thickness of the rubber layer that exists between the annular structure 10 and the carcass 22 can be adjusted relatively easily because the annular structure 10 has the through-holes 10H. In this method, the second rubber 21, which is used mainly for the purpose of facilitating adhesion with the annular structure 10, is disposed only on a face of the inner side in the tire radial direction of the annular structure 10, and vulcanization is carried out such that the second rubber 21 migrates to the outer side in the radial direction of the annular structure 10. In this method, the tire 1 can be lightened because the thickness of the second rubber 21 can be reduced.

Figures 1, 25:
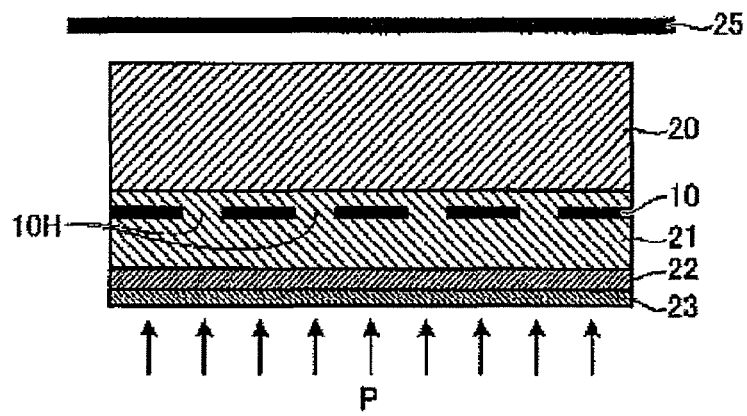
Figures 2, 25:
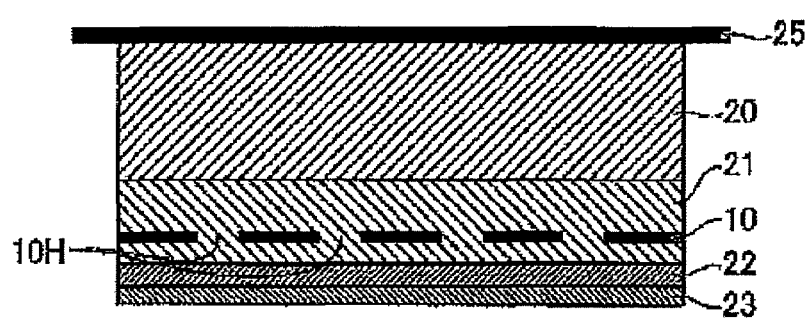
Figures 1, 26:
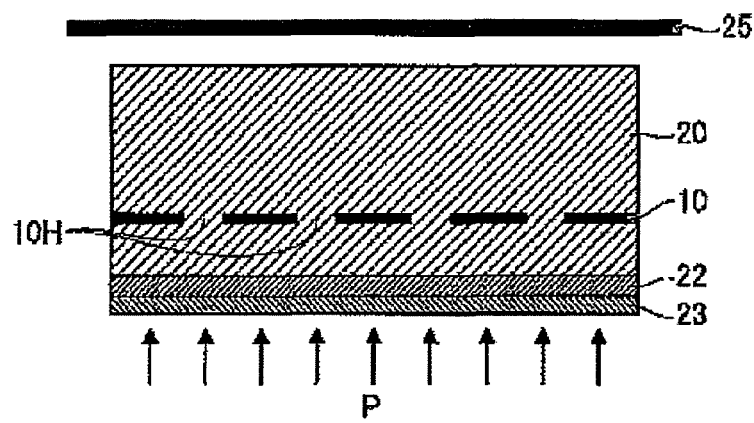
Figures 2, 26:
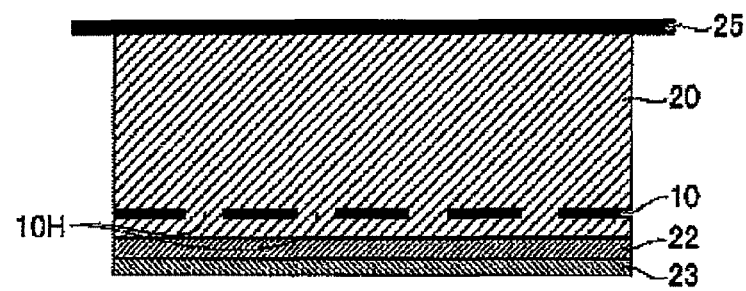

FIGS. 25-1 and 25-2 illustrate an example in which the annular structure 10 is embedded in the second rubber 21 prior to vulcanization and then vulcanization is carried out. Specifically, the second rubber 21 may be disposed on the inner side in the tire radial direction and the outer side in the radial direction of the annular structure 10. This method is useful when desiring to avoid the first rubber 20 contacting the outer side in the radial direction of the annular structure 10 and remaining thereon. Additionally, with this method, the adhesive strength between the annular structure 10 and the second rubber 21 is greatest. FIGS. 26-1 and 26-2 illustrate an example in which the annular structure 10 is embedded in the first rubber 20, and the carcass 22 is disposed on the inner side in the tire radial direction of the first rubber 20, without using the second rubber 21; and, thereafter, vulcanization is carried out. Specifically, vulcanization is carried out after disposing the first rubber 20 on the outer side in the radial direction and the inner side in the radial direction of the annular structure 10. With this method, manufacturing costs can be reduced because there is no increase in the types of rubber used.

Fourth Embodiment

Figure 27:
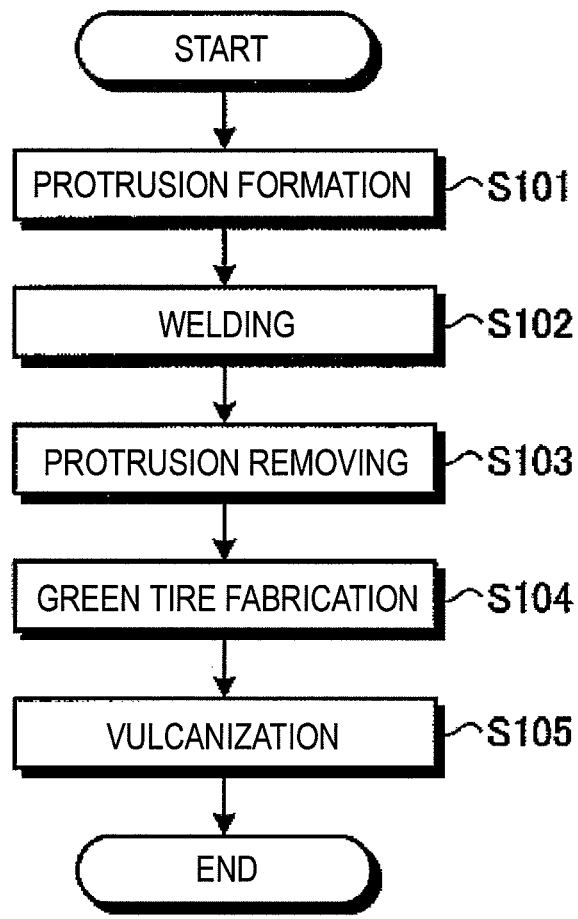
FIG. 27 is a flowchart showing steps of a method for manufacturing the annular structure included in the tire.
Figures 1, 28:
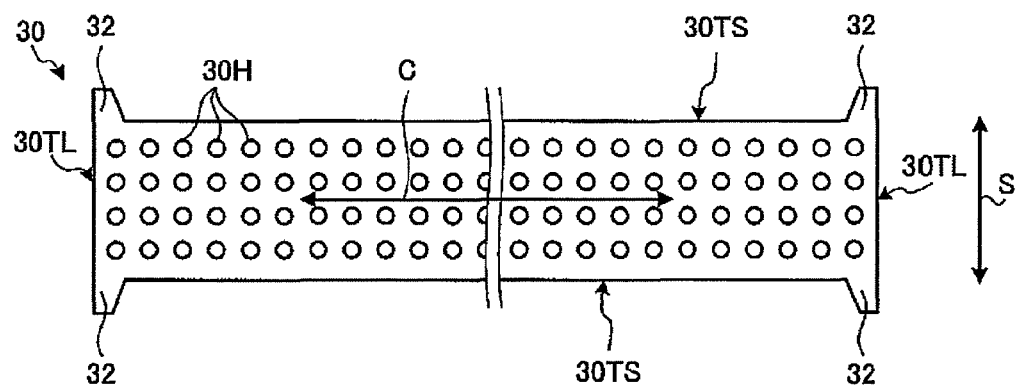
Figures 2, 28:
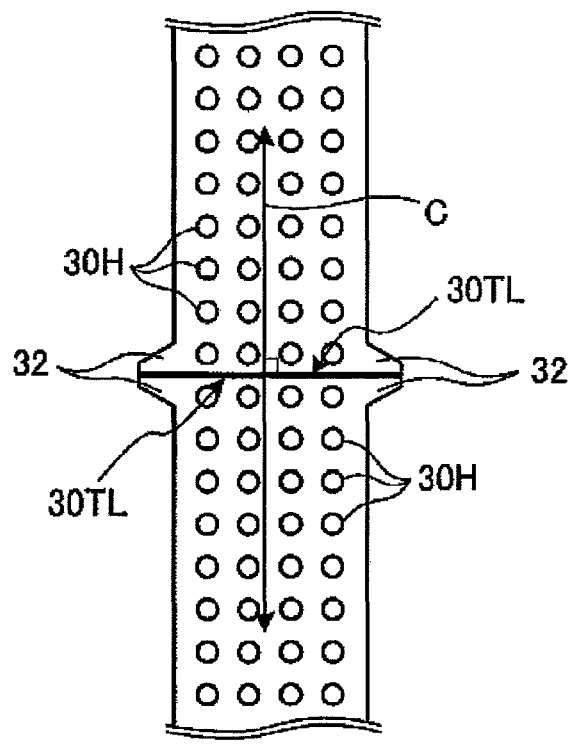
Figures 3, 28:
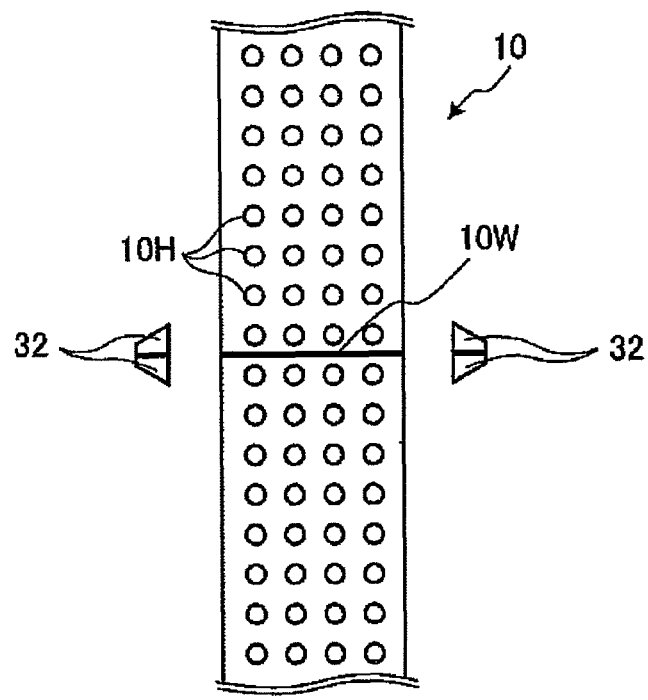
Figures 4, 28:
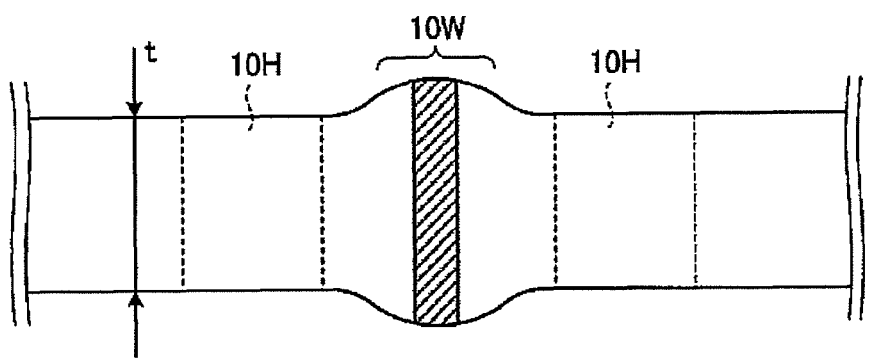

In the fourth embodiment, a method for manufacturing the annular structure described above will be described. FIG. 27 is a flowchart showing steps of a method for manufacturing the annular structure included in the tire. FIGS. 28-1 to 28-3 are explanatory drawings illustrating steps of the method for manufacturing the annular structure. FIG. 28-4 is a cross-sectional view illustrating a thickness of a welded portion. FIG. 28-4 illustrates a cross-section of the plate material cut on a plane orthogonal to a plate face of the plate material. Hereinafter, the tire 1 and the annular structure 10 according to the first embodiment are used as examples but the tire according to the second embodiment is the same.

When manufacturing the annular structure 10, first, as illustrated in FIG. 28-1, a plate material 30 having a rectangular form when viewed planarly, and having protrusions 32 that protrude outward in a direction parallel to a lateral direction is formed on sides of both edges 30TL and 30TL in the longitudinal direction (the direction indicated by arrow "C" in FIG. 28-1) on both edges 30TS and 30TS in the lateral direction (the direction indicated by arrow "S" in FIG. 28-1) (step S101, FIG. 28-1). When viewed planarly, both the edges 30TS and 30TS in the lateral direction correspond to the long sides of the rectangular plate material 30. Also, when viewed planarly, both the edges 30TL and 30TL in the longitudinal direction correspond to the short sides of the rectangular plate material 30. The plate material 30 can be obtained by, for example, cutting a large metal plate member. In this embodiment, the plate material 30 has a plurality of through-holes 30H.

Next, both edges 30TL and 30TL of the plate material 30 in the longitudinal direction are abutted and joined by welding (step S102, FIG. 28-2). Both the edges 30TL and 30TL in the longitudinal direction preferably are orthogonal to the longitudinal direction of the plate material 30 (the direction indicated by arrow "C" in FIG. 28-2). With such a configuration, if repeated bending occurs in the welded portion as a result of repeated deformation of the annular structure 10 in the radial direction, declines in the durability of the annular structure 10 can be suppressed because the length of the welded portion where the repeated bending is occurring can be shortened. As a result, when using the annular structure 10 in the tire 1, declines in durability can be suppressed.

Types of welding that can be used include gas welding (oxyacetylene welding), arc welding, TIG (Tungsten Inert Gas) welding, plasma welding, MIG (Metal Inert Gas) welding, electroslag welding, electron beam welding, laser beam welding, ultrasonic welding, and the like. Thus, the annular structure 10 can be easily manufactured by welding both edges of the plate material. Note that following welding, the plate material 20 may be subjected to heat-treating and/or drawing. As a result, the strength of the manufactured annular structure 10 can be increased. For example, when using precipitation hardening stainless steel, an example of the heat-treating is one in which the plate material 20 is heated at 500° C. for 60 minutes. The conditions of the heat-treating are not limited to this though, and can be modified as necessary based on the characteristics sought.

Next, after welding, the protrusions 32 are removed and the annular structure 10 illustrated in FIG. 2-1 is obtained (step S103, FIG. 28-3). Heat-treating and the like of the annular structure 10 is preferably conducted after the protrusions 32 of the welded cylindrical plate material 30 are cut off. Because the strength of the welded cylindrical plate material 30 (annular structure 10) will be increased as a result of the heat-treating or the like, the protrusions 32 can be easily cut off by cutting off the protrusions 32 prior to conducting heat-treating or the like. After obtaining the annular structure 10, the rubber layer 11 and the carcass portion 12 illustrated in FIG. 3 are attached to the annular structure 10, and the bead portions 13 are provided in the carcass portion 12. Thus, a green tire is fabricated (step S104). Thereafter, the green tire is vulcanized (step S105) and the tire 1 illustrated in FIG. 1 is completed. Note that the method for manufacturing the annular structure 10 is not limited to the example described above. For example, the annular structure 10 may be manufactured by cutting a cylinder or, alternately, the annular structure 10 may be manufactured via extrusion molding.

The annular structure 10 has a welded portion 10W as illustrated in FIG. 28-3. As illustrated in FIG. 28-4, the welded portion 10W may have a thickness that is greater than a thickness of surroundings thereof. A thickness t at a region of the welded portion 10W, except at the welded portion 10W itself, is not less than 0.1 mm and not more than 0.8 mm, and is preferably not less than 0.15 mm and not more than 0.7 mm. Additionally, the thickness of the portion of the welded portion 10W that is greater than the thickness of the surroundings thereof is not more than 1.3 times, and preferably not more than 1.2 times the thickness of said surroundings. When within this range, durability against repeated bending can be ensured while ensuring pressure resistance performance. The region "except at the welded portion 10W itself" refers to the thickness of the plate material 20 prior to welding and, in the annular structure 10, refers to the regions other than the welded portion 10W that have a uniform thickness.

In this embodiment, after joining the plate material 30 by welding, preferably the welded cylindrical plate material 30 is subjected to heat-treating and/or the welded cylindrical plate material 30 is subjected to drawing in an axial direction of the cylinder. As a result of such treatment, the material characteristics of the welded portion (metallographic structure) that has been altered by the welding can be adjusted to be similar to those of the non-welded portion and, therefore, breaking strength at the welded portion is increased. Note that, when performing the treatments described above, a plurality of the annular structure 10 can be simultaneously manufactured by: fabricating a long, cylindrical material by welding a plate material having a large width direction dimension; subjecting the obtained cylinder to the treatments described above; and, thereafter, cutting the cylinder perpendicular to an axis thereof at the annular structure width Wm (belt width).

What is claimed is:

1. A pneumatic tire comprising:
   a cylindrical annular structure having a plurality of through-holes;
   a rubber layer that will become a tread portion provided along a circumferential direction of the annular structure on an outer side of the annular structure;
   a plurality of main grooves provided on an outer side in a radial direction of the rubber layer, each main groove being parallel to the circumferential direction of the annular structure;
   a land portion partitioned by the main grooves; and
   a carcass portion including fibers covered by rubber, provided on at least both sides in a direction parallel to a center axis of a cylindrical structure including the annular structure and the rubber layer, wherein
   an opening ratio of the through-holes in a region where each of the plurality of main grooves is provided is less than that in a region where the land portion is provided, and
   spacing of the plurality of through-holes increases gradually from outer sides in the width direction toward a center in the width direction.

2. The pneumatic tire according to claim 1, wherein a proportion of a total of an opening area of the through-holes to a surface area of the outer side in the radial direction in a case where the annular structure does not comprise the through-holes, is not less than 1% and not more than 30% in a region in a vicinity of a circumferential groove and not less than 0.5% and not more than 15% in a region where the circumferential groove is provided.

3. The pneumatic tire according to claim 1, wherein a cross-sectional area of one of the through-holes is not less than 0.1 mm² and not more than 100 mm².

4. The pneumatic tire according to claim 1, wherein a sum of the area of the through-holes is not less than 0.5% and not more than 30% of the surface area of the outer side in the radial direction of the annular structure.

5. The pneumatic tire according to claim 1, wherein the outer side of the rubber layer and the outer side of the annular structure, except a groove portion of the rubber layer, are parallel to the center axis.

6. The pneumatic tire according to claim 1, wherein the annular structure is disposed farther outward in a radial direction of the structure than the carcass portion.

7. The pneumatic tire according to claim 1, wherein the annular structure is a metal.

8. The pneumatic tire according to claim 1, wherein a dimension in the direction parallel to the center axis of the annular structure is not less than 50% and not more than 95% of a total width in the direction parallel to the center axis of the pneumatic tire.

9. The pneumatic tire according to claim 1, wherein a cross-sectional area of one of the through-holes is not less than 0.12 mm² and not more than 80 mm².

10. The pneumatic tire according to claim 1, wherein a cross-sectional area of one of the through-holes is not less than 0.15 mm² and not more than 70 mm².

11. The pneumatic tire according to claim 1, wherein a form of the through-holes is elliptical.

12. The pneumatic tire according to claim 1, wherein an equivalent diameter 4×A/C of the through-holes, where C is a circumferential length of the through-holes and A is the opening area of the through-holes, is not less than 0.5 mm and not more than 10 mm.

13. The pneumatic tire according to claim 1, wherein the through-holes have a circular form and a diameter of not less than 1.0 mm and not more than 8.0 mm, and wherein an equivalent diameter and the diameter of different of the through-holes are different, the equivalent diameter being defined by 4×A/C of the through-holes, where C is a circumferential length of the through-holes and A is the opening area of the through-holes.

14. The pneumatic tire according to claim 1, wherein a sum of an area of the through-holes is not less than 1.0% and not more than 20% of a surface area of the outer side in the radial direction of the annular structure.

15. The pneumatic tire according to claim 1, wherein the annular structure comprises recesses and protrusions which are unequally spaced.

16. The pneumatic tire according to claim 1, wherein the annular structure comprises a welded portion, and a thickness at a region of the welded portion, except at a weld itself in the welded portion, is not less than 0.1 mm and not more than 0.8 mm.

17. The pneumatic tire according to claim 1, wherein the annular structure comprises a welded portion, and a thickness at a region of the welded portion, except at a weld itself in the welded portion, is not less than 0.15 mm and not more than 0.7 mm.

18. The pneumatic tire according to claim 1, wherein the annular structure comprises a welded portion, and a thickness of a portion of the welded portion that is greater than a thickness of surroundings thereof is not more than 1.2 times the thickness of the surroundings.

19. The pneumatic tire of claim 1, wherein each of the main grooves has a corresponding continuous annular band having no through-holes.

20. The pneumatic tire of claim 1, wherein
the land portion comprises a plurality of land portions;
the annular structure includes recesses and protrusions on both edges in the width direction with one of the plurality of through-holes present in each of the protrusions, and
the regions are circumferential regions extending along a circumference of the annular structure, the regions including a region extending between side of the plurality of main grooves as projected onto the annular structure and a region extending between sides of the plurality of land portions as projected onto the annular structure.

21. A pneumatic tire comprising:
a cylindrical annular structure having a plurality of through-holes, wherein a sum of an area of the through-holes is not less than 0.5% and not more than 20% of a surface area of an outer side in the radial direction of the annular structure;
a rubber layer that will become a tread portion provided along a circumferential direction of the annular structure on the outer side of the annular structure; and
a carcass portion including fibers covered by rubber, provided on at least both sides in a direction parallel to a center axis of the cylindrical structure including the annular structure and the rubber layer, wherein
a product of an elastic modulus of the annular structure and a thickness of the annular structure is not less than 10 GPa·mm and not more than 500 GPa·mm, and
a diameter or equivalent diameter of the plurality of through-holes decrease gradually from outer sides in the width direction toward a center in the width direction.

* * * * *